United States Patent [19]
Koga et al.

[11] Patent Number: 5,645,241
[45] Date of Patent: Jul. 8, 1997

[54] DEVICE FOR WINDING MAGNETIC TAPE OF TAPE CASSETTE IN GOOD ORDER

[75] Inventors: Hirohisa Koga, Kanagawa; Manabu Hanjo, Tokyo; Takayuki Kurahara, Kanagawa, all of Japan

[73] Assignee: Sony Corporation, Tokyo, Japan

[21] Appl. No.: 552,862

[22] Filed: Nov. 3, 1995

[30] Foreign Application Priority Data

Nov. 8, 1994 [JP] Japan .................................. 6-298952

[51] Int. Cl.$^6$ .................................................. G11B 15/43
[52] U.S. Cl. .......................................... 242/336; 242/334.5
[58] Field of Search ............................. 242/334, 334.5, 242/336, 355.1, 422.5; 360/94, 95

[56] References Cited

U.S. PATENT DOCUMENTS

| 3,102,699 | 9/1963 | Proctor | 242/334.5 |
| 5,506,736 | 4/1996 | Ota | 360/94 |

FOREIGN PATENT DOCUMENTS

| 59-143845 | 8/1984 | Japan | 242/334.5 |
| 63-112845 | 5/1988 | Japan | 360/94 |
| 1-245459 | 9/1989 | Japan | 360/94 |

*Primary Examiner*—John P. Darling
*Attorney, Agent, or Firm*—Jay H. Maioli

[57] ABSTRACT

A device for winding a magnetic tape in good order on a tape cassette which has been repeatedly used in a telecasting station, is arranged at a mid portion between a pair of tape reels on an inner peripheral side of a running path of the magnetic tape pulled out from a tape cassette. The device has a touch roll abutted against the magnetic tape along the tape width for affording a constant contact pressure against the outer periphery of the tape reel as the tape is round, an arcuately-shaped roll arm member rotatably supporting the touch roll at its one end for facing the touch roll to the inside of the tape cassette, a roll arm supporting member for slidably supporting the roll arm member so that the touch roll is moved in the diametrical direction with respect to the tape reel, a plate on which the roll arm supporting member is assembled, and a roll arm driving mechanism for sliding the roll arm member along the roll arm supporting member. The roll arm supporting member is moved by the roll arm driving mechanism along the roll arm supporting member so that the line of force of the contact pressure applied to the magnetic tape taken up on the outer periphery of the tape reel traverses the center of rotation of the tape reel.

17 Claims, 19 Drawing Sheets

DEVICE FOR WINDING MAGNETIC TAPE OF TAPE CASSETTE IN GOOD ORDER

BACKGROUND OF THE INVENTION

This invention relates to a device for winding a magnetic tape in good order in a tape cassette which has been repeatedly used in e.g., a broadcasting station.

A tape cassette in general has rotatably housed therein a pair of tape reels each being made of a hub and upper and lower flange portions integrally mounted on upper and lower lateral sides of the hub. Between these tape reels is placed a magnetic tape which is paid out from a supply side reel for recording or reproduction of information signals in a recording/reproducing unit so as to be taken up on a take-up reel. The digital video tape cassette, employed for working use in e.g., broadcasting stations, employs a magnetic tape which, for assuring recording/reproduction for prolonged time, is longer in length than the tape in a typical tape cassette for personal use.

The video tape cassette, employed for reproduction in program broadcasting, is laid in store after a decision is given as to whether or not the tape cassette can be re-used based upon the channel condition represented on the basis of the error data of the playback data. Since the values of the channel conditions include all conditions from the recording conditions up to detection of digital data, they are largely dependent upon the performance of the video tape recorder and hence are not necessarily adequate for evaluation of the video tape itself. Thus, a method for evaluation has been proposed which consists of associating the status of digital errors ascribable to the video tape with the channel conditions.

The digital errors mainly ascribable to the video tape include burst errors caused by scratches in the magnetic layer of the video tape and dropout. The digital error is also caused by dust and dirt, contaminations or creases on the surface of the magnetic layer, or edge damage. Thus it is desirable that quality evaluation of the video tape be performed comprehensively for these respective items.

For reproducing the video tape cassette, the video tape is reeled out from the supply reel so as to be taken up and wound on the take-up reel. Thus the video cassette tape is rewound for enabling re-use after quality evaluation of the video tape. On the other hand, the video tape, which has been reproduced, is loaded on a tape take-up device for rewinding. During this rewind operation, the dust and dirt or contamination on the surface of the magnetic layer or powder debris are removed by way of cleaning. The magnetic tape cleaning device is usually positioned directly ahead of a point of introducing the video tape drawn out from the take-up reel to the supply reel.

On the other hand, the tape take-up device is provided with a device for taking up a video tape in a good condition on the supply side reel. The device for taking up the video tape in a good condition affords a pressure contact force against the video tape for preventing edge damage due to misalignment or air entrainment between superposed turns of the video tape responsible for crease formation. Similarly to the magnetic tape cleaning device, the device for taking up the video tape in a good condition is positioned directly ahead of the point of introducing the video tape drawn out from the take-up reel to the supply reel.

The conventional device for taking up the video tape in a good condition includes a roll arm member one end of which rotatably carries a touch roll configured for affording a pressure contact force against the magnetic tape. This roll arm member is moved with respect to the magnetic tape taken up on the tape reel for being pressure contacted with the magnetic tape.

With the conventional device for taking up a video tape in a good condition, the magnetic tape taken up on the tape reel is subjected to a contact pressure force extending in the circumferential direction of the magnetic tape taken up on the tape reel as the contact pressure force produced by the touch roll is deviated from the center of rotation of the tape reel. The result is that the magnetic tape taken up on the take-up drum is affected by excess tightness or excess slack in winding. Thus it is required of the touch roll to direct the line of force of the contact pressure against the magnetic tape towards the center of rotation of the tape reel.

If the contact pressure force exerted by the touch roll is diminished for preventing destruction of the magnetic tape by the contact pressure force, an air layer between the superposed turns of the magnetic tape cannot be removed sufficiently such that satisfactory winding state cannot be achieved.

With such device for taking up the video tape in a good condition, the touch roll is pressed against the magnetic tape by an elastic member. As the winding diameter of the magnetic tape taken up on the tape reel is increased, the amount of deviation of the elastic member is increased, with the result that the contact pressure force of the touch roll is progressively increased.

That is, as the winding diameter of the magnetic tape taken up on the tape reel is increased, the contact pressure force exerted by the touch roll on the magnetic tape taken up on the tape reel is increased. Thus, it is up to the roll arm member to shift the touch roll along the diameter of the tape reel responsive to changes in the winding diameter of the magnetic tape.

In addition, the magnetic tape for work use for recording/reproduction for a prolonged time has a long tape length and an extremely thin tape thickness, so that press marks by the edge portions of the touch roll are produced by the touch roll being thrust against the magnetic tape thus affecting the playback waveform.

For overcoming such inconvenience, the touch roll has its upper and lower ends chamfered. However, with the chamfered touch roll, the constant pressure force, operating on the video tape substantially uniformly at a contact portion with the video tape, is suddenly changed at a point of separation of the touch roll from the video tape as a boundary. Such abrupt changes in the thrusting force produce press marks of the touch roll on the video tape.

For example, with the tape reel having a flangeless reel not having flanges on the upper and lower surfaces of the hub, the touch roll shape is not controlled by the facing distance between the flanges, so that it becomes possible to thrust a touch roll having a longer axial length than the width of the video tape against the entire range along the width of the video tape. The press mark is less liable to be produced if the video tape is of a larger thickness as in the case of the video tape for open reel. However, such flangeless reel or a video tape having a larger thickness cannot be adopted for a digital video tape cassette for business use.

On the other hand, a tape reel is integrally molded with upper and lower flanges from a synthetic resin material in view of productivity, weight and dimensional accuracy. The hub portion of the tape reel has a draft in view of mold release properties. The draft of the hub portion is designed so that it is slightly smaller in diameter towards the flange since the lower flange by which the tape reel is contacted with the reel block is used as a reference surface.

Thus, even if the magnetic tape is wound on the tape cassette in good order under the uniform thrusting force on the outer peripheral surface of the hub portion by the device for taking up the video tape in a good condition, the video tape tends to be subjected to a force of restoration by being contracted due to changes with lapse of time as a result of prolonged storage. The tightening pressure on the hub portion acts with a strong force and a weak force at a larger diameter portion and a smaller diameter portion of the hub portion, respectively. Thus the video tape is deteriorated more significantly at the lower flange portion designed as a larger diameter portion.

For removing air inclusion between respective turns of the video tape taken up on the tape reel for prohibiting the creasing or misregistration between neighboring turns of the tape, it suffices to exert a larger trusting force by a touch roll for taking up the tape on the tape reel. Thus a device for taking up the video tape in a good condition has been proposed in which plural protrusions are formed on the outer peripheral surface of the touch roll for exerting a locally large force on the video tape while a constant thrusting force on the tape is maintained. However, since the video tape is subjected to unequal forces between the points contacted by the protrusions and those contacted by the plain portions, as the tape is taken up, the tape undergoes changes in profile thus deteriorating the playback output.

OBJECTS AND SUMMARY OF THE INVENTION

It is therefore an object of the present invention to provide a device for taking up a video tape in a good condition which can be reduced in size and in which the magnetic tape can be taken up reliably in good condition by properly moving a touch roll responsive to changes in the winding diameter of the magnetic tape wound on the tape reel for pressing the touch roll against the magnetic tape at a constant pressure.

It is another object of the present invention to provide a touch roll for a device for taking up a video tape in a good condition by which the magnetic tape such as a video tape is taken up in a trim condition on a tape reel without misregistration or creasing and by which the winding state is not deteriorated on prolonged storage.

According to the present invention, there is disclosed a device for winding a magnetic tape in good order on a tape cassette. The device is arranged at a mid portion between a pair of tape reels on an inner peripheral side of a running path of the magnetic tape pulled out from a tape cassette. The device has a touch roll abutted against the magnetic tape along the tape width for affording a constant contact pressure against the outer periphery of the tape reel as the tape is wound, an arcuately-shaped roll arm member rotatably supporting the touch roll at its one end for facing the touch roll to the inside of the tape cassette, a roll arm supporting member for slidably supporting the roll arm member so that the touch roll is moved in the diametrical direction with respect to the tape reel, a plate on which the roll arm supporting member is assembled, and a roll arm driving mechanism for sliding the roll arm member along the roll arm supporting member. The roll arm supporting member is moved by the roll arm driving mechanism along the roll arm supporting member so that the line of force of the contact pressure applied to the magnetic tape taken up on the outer periphery of the tape reel traverses the center of rotation of the tape reel.

The roll arm supporting member is provided with a bearing member on a circumference of a circle having the center of curvature of the roll arm member as the center. The bearing member slidably supports the roll arm. The roll arm supporting member is made up of a first roll arm supporting member supporting the inner periphery of said roll arm member and a second roll arm supporting member supporting the outer periphery of said roll arm member.

At least one of the first and second roll arm supporting members is provided with a flexible abutment member affording a contact pressure to the roll arm supporting member. A gear portion is formed for extending along the inner peripheral surface of the roll arm member.

The roll arm member has a sliding surface of an arcuate cross-section on each of its lateral sides. The roll arm member is slidably supported by its sliding surface on the roll arm supporting member in a point-contact state. The roll arm member is integrally formed with a sliding lug of a rectangular cross-section on each lateral surface, and first to fourth sliding portions are formed at the corners on the outer periphery of the sliding lugs.

A vertical movement mechanism is provided for moving the plate to an uplifted position receded above the running path of the magnetic tape and a descent position in which the touch roll is at the same height level as the magnetic tape taken up on the tape reel.

The roll arm driving mechanism has a first detection sensor for detecting the amount of movement of the roll arm member and a first detection member associated with the first detection sensor. The roll arm driving mechanism also has second detection sensor for detecting an overload generated in the roll arm abutted against the tape reel and a second detection member associated with said detection sensor.

The cylindrically-shaped touch roll, provided in the device for taking up a video tape in a good condition, has an axial length slightly smaller than the facing distance between the upper and lower flanges so that the touch roll can be intruded into a space between the upper and lower flanges for being abutted against substantially the entire area of the magnetic tape placed on the outer periphery of the hub. The touch roll is of an arcuate cross-section in the outer peripheral surface thereof so that the diameter thereof is progressively smaller from an axially mid portion towards both axial end portions.

The portion of the touch roll associated with the upper flange of the tape reel is larger than the diameter of the portion thereof associated with the lower flange of the tape reel.

The cylindrically-shaped touch roll has an axial length slightly smaller than the facing distance between the upper and lower flanges so that the touch roll can be intruded into a space between the upper and lower flanges for being abutted against substantially the entire area of the magnetic tape placed on the outer periphery of the hub. The touch roll has an integrally formed spirally extending rib on the outer periphery thereof.

The spirally extending rib formed integrally on the outer peripheral surface thereof is such a spirally extending rib which guides the magnetic tape towards the upper flange of the tape reel with respect to the running direction of the magnetic tape.

With the above-described device for taking up a video tape in a good condition, since the roll is arcuately-shaped, the line of force of the contact pressure applied by the roll arm member traverses the center of rotation of the tape reel. Thus the roll arm member is able to positively remove air intruded into the space between respective turns of the tape wound on the tape reel. Thus the device for taking up the magnetic tape of the tape cassette in trim state is able to maintain a proper force of friction between respective turns of the tape by the roll arm member for assuring a satisfactory winding state.

In addition, with the above-described device for taking up a video tape in a good condition, the distance of movement of the roll arm member pressed against the magnetic tape as it is wound on the tape reel is diminished.

With the above-described device for taking up a video tape in a good condition, since there is provided the vertical movement mechanism, the plate is receded to an uplifted position overlying the running path of the magnetic tape when the magnetic tape is reeled out of the tape cassette. After the tape running path is established, the plate is moved to a descent position in which the touch roll is at the same height level as the magnetic tape taken up on said tape reel.

Since the device for taking up a video tape in a good condition has the first detection sensor for detecting the amount of movement of the roll arm member and the first detection member associated with the first detection sensor, the contact pressure applied by the touch roll to the magnetic tape taken up on the tape reel is detected. The roll arm member is moved responsive to the amount of change in the winding diameter of the magnetic tape so that the touch roll is perpetually contacted with a constant contact pressure against the magnetic tape taken up on the tape reel.

By providing the second detection sensor for detecting an overload generated in the roll arm abutted against said tape reel and a second detection member associated with the detection sensor, movement of the roll arm member is stopped on generation of an overload in the contact pressure afforded to the magnetic tape taken up on the tape reel.

With the above-described touch roll provided on the device for winding the magnetic tape in a trim state according to the present invention, the touch roll is intruded into a space between upper and lower flanges of a take-up side reel for thrusting the magnetic tape against the outer peripheral surface of a hub of the take-up side reel. The magnetic tape is reeled out from a supply side reel before being taken up on the take-up side reel. The supply-side reel and the take-up side reel are each formed with the hub and the upper and lower flanges formed integrally on the upper and lower lateral sides of the hub. The touch roll, arcuately-shaped in cross-section with the diameter being progressively reduced from the mid portion towards both end portions, thrusts the video tape with a thrusting force which becomes progressively smaller from the mid portion towards both end portions. Thus the thrusting force is not acutely changed at both end portions of the touch roll and hence no thrusting mark by the touch roll is left on the magnetic tape.

The touch roll, progressively increased in diameter towards the upper end, thrusts the video tape taken up on the tape reel with a thrusting pressure which is gradually increased from the lower flange towards the upper flange. Thus the video tape, taken up on the tape reel the hub of which is inclined with a draft which is gradually decreased in diameter from the lower flange towards the upper flange, is thrust by the touch roll with a thrusting force which is uniform in a direction along the width so that the force of restoration due to changes with lapse of time becomes uniform over the entire length of the hub.

The spirally extending rib, formed on the outer periphery of the roll, thrusts the magnetic tape with a constant thrusting force over the entire width of the video tape taken up on the take-up side reel with a larger surface pressure per unit area for removing the air between respective turns of the wound tape. Thus the frictional coefficient between the respective turns of the tape is increased so that the tape 4 can be taken up in a trim state on the outer periphery of the hub. Thus there is no risk that the video tape will be changed in shape at a pre-set portion along the tape width.

DETAILED DESCRIPTION OF THE EMBODIMENTS

Figure 1:
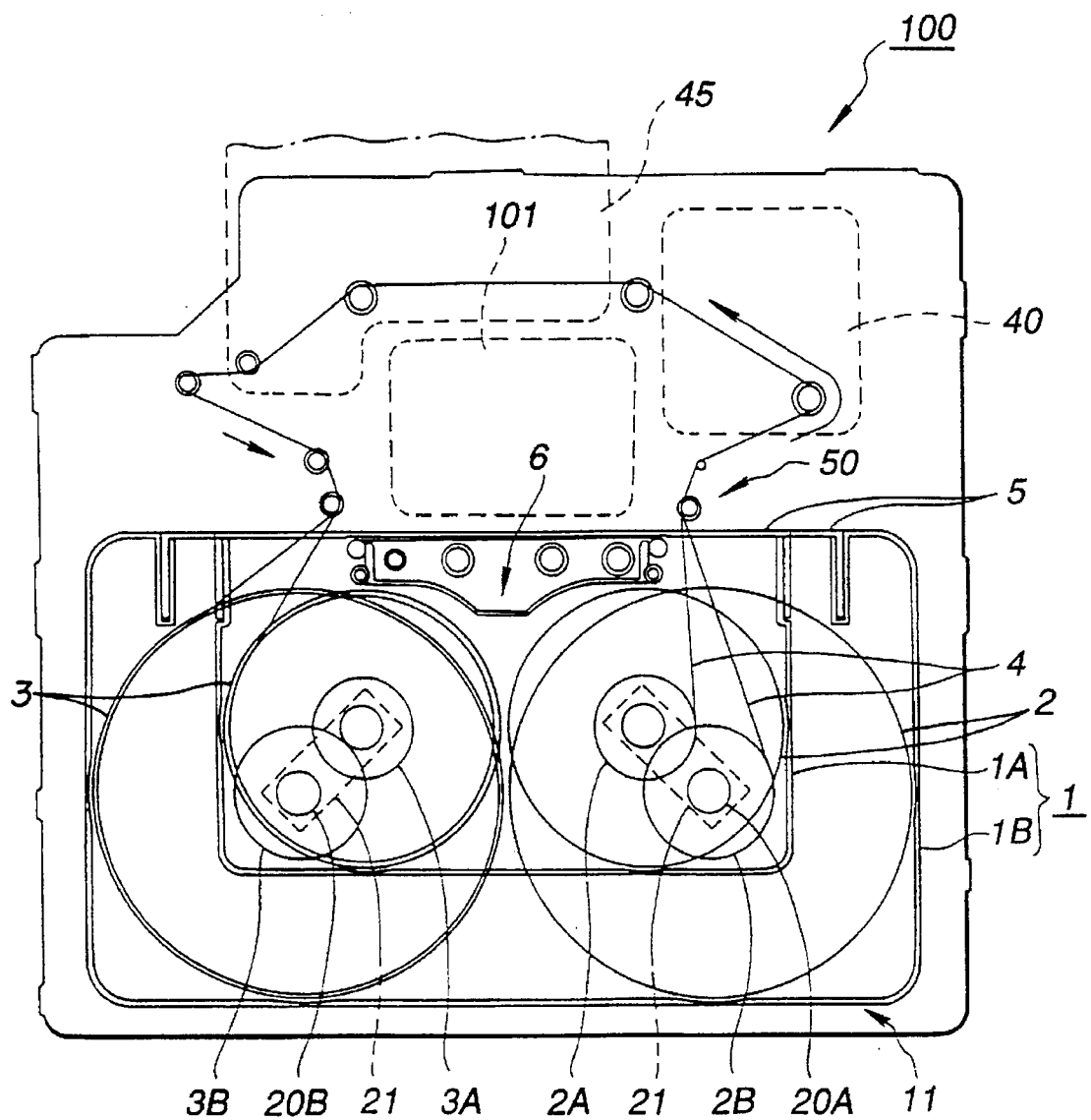
FIG. 1 is a plan view showing a tape evaluation device employing a device for winding a magnetic tape in good order embodying the present invention.
Figure 2:
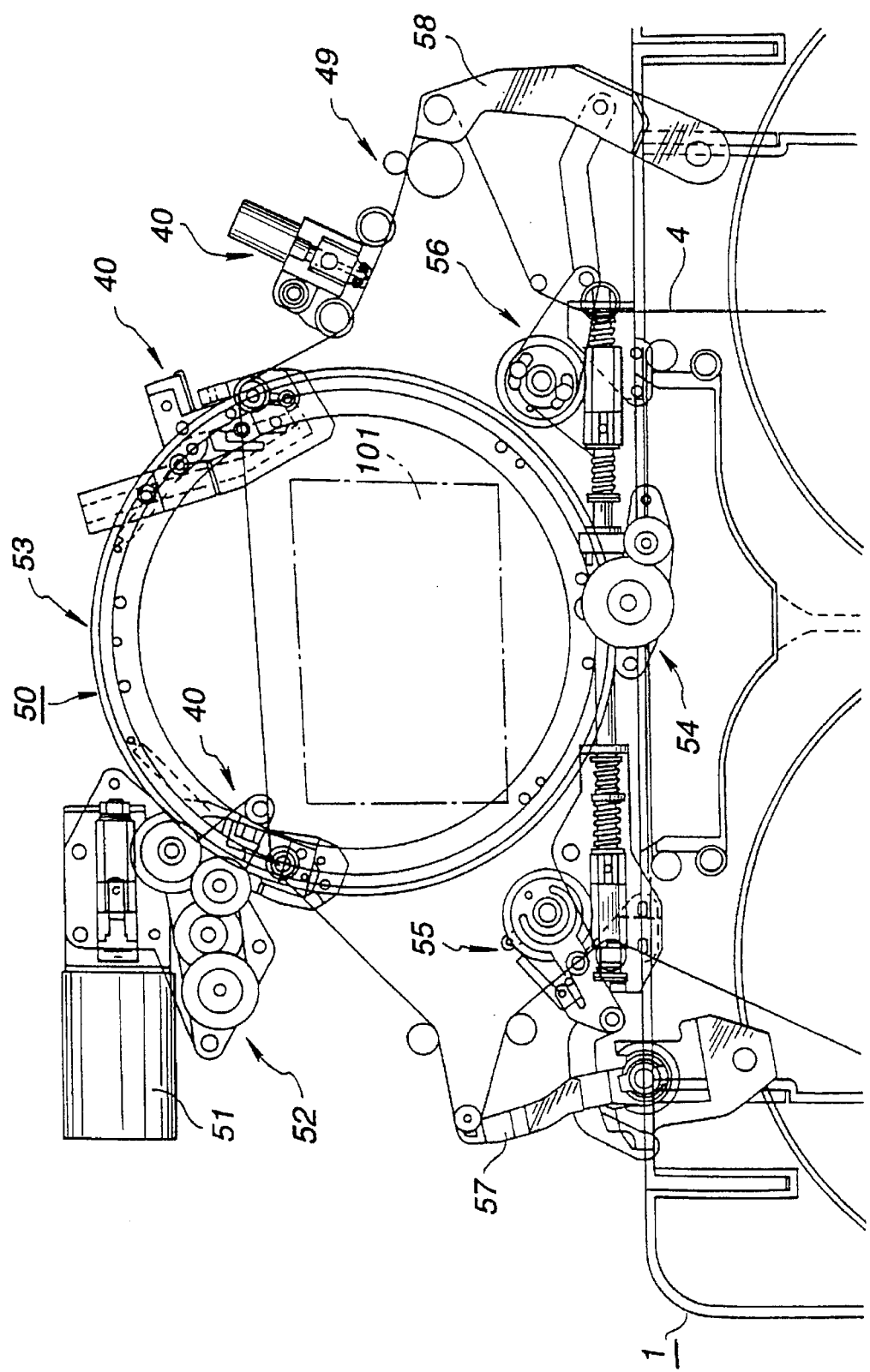
FIG. 2 is a plan view showing a loading unit for the tape evaluation device shown in FIG. 1.

Referring to FIGS. 1 and 2, a device embodying the present invention for winding a magnetic tape of a tape cassette in trim order, employed in a tape evaluating device 100, is explained in detail. The tape evaluating device 100 is a device in which a magnetic tape 4 placed around a take-up side reel 2 is rewound on a supply reel 3 and simultaneously evaluated as to whether it can be re-used in order that a used video tape cassette 1 telecast by a telecasting station is restored to a re-usable state. The video tape cassette 1 is checked by the tape evaluating device 100 as to whether or not it can be re-used. If the tape cassette is found to be re-usable, it is stored directly, whereas, if it is found to be non-usable, it is discarded or otherwise disposed of.

The tape cassette 1 has the supply side reel 3 and the take-up side reel 2 in the inside of a main cassette body portion in a well-known manner. The magnetic tape 4, placed around the peripheral surface of the supply side reel 3, is led along the inner surface of a lid 5 rotatably assembled on the front side of the main cassette body portion so as to be placed around the peripheral surface of the take-up side reel 2.

Within the tape cassette 1 is defined a substantially convex-shaped loading spacing 6 disposed in the inner side of the lid 5. Thus, when the video tape cassette 1 is loaded on a recording/reproducing apparatus, the lid 5 is turned for opening the front side of the main cassette body portion. The loading mechanism on the recording/reproducing apparatus is introduced into the loading spacing 6 for pulling out the magnetic tape 4 by way of performing a pre-set loading operation.

For recording/reproduction, the video tape cassette 1 is reeled out from the supply side reel 3 for reproducing information signals recorded on the magnetic tape 4 or recording information signals on the magnetic tape 4 before being taken up on the take-up side reel 2. Thus, in the video tape cassette 1, the magnetic tape 4 is taken up on the take-up side reel 2 on termination of the recording/reproducing operation.

Meanwhile, digital video tape cassettes for telecasting, such as a D-1 digital video tape cassette or a D-2 digital video tape cassette, each having a width of 19.01 mm, are classified into S-cassette, M-cassette and L-cassette, having different outer profiles, depending upon the recording time. With these digital video cassettes for telecasting, the main cassette body portion is of the same design specification as to the thickness which is set to 33 mm. However, an M-cassette 1A has a size along the length of 254 mm and a size along the width of 150 mm, while an L-cassette 1B has a size along the length of 366 mm and a size along the width of 206 mm.

Thus the M-cassette 1A and the L-cassette 1B are designed with different relative distances and positions of the supply—side reel 3 and the take-up side reel 2. Meanwhile, the tape evaluating device 100 needs to be constructed with a different construction of the device for taking up the magnetic tape of the S-cassette in trim order, while the demand for the S-cassette is rather low. Thus, if the S-cassette is loaded in the cassette loading section 11, it is automatically ejected based upon an output of the discrimination sensor.

The tape evaluating device 100 includes a video cassette loading unit 11 for loading the video tape cassette 1 therein, a loading unit 50 for reeling the magnetic tape 4 out of the video tape cassette 1 loaded on the tape cassette loading unit 11 for defining a tape running path, a magnetic tape cleaning unit 40 for removing dust and dirt affixed to the magnetic tape 4, a magnetic tape detection unit 45 for detecting the deteriorated state of the magnetic tape 4, and a device 101 for winding the magnetic tape 4 on the supply-side reel 3 in trim order.

The magnetic tape cleaning unit 40, magnetic tape detection unit 45 and the device 101, provided in the tape evaluating device 100, are arranged in this order looking from the take-up side reel 2, for extending along the tape running path along the supply side reel 3.

The cassette loading unit 11 has an inner spacing large enough to load any of the two sorts of the video tape cassettes having different outer profiles and design specifications, namely the video tape cassettes 1A, 1B. The cassette loading unit 11 has on its bottom side a pair of reel shafts 20A, 20B configured for being fitted in reel openings in the supply side reel 3 and the take-up side reel 2, respectively, for running the reels 3, 2 in rotation. The cassette loading unit 11 is provided with a lid opening mechanism, not shown in detail. When the cassette loading unit 11 is loaded in position, the front side lid 5 is turned, so that the magnetic tape 4 disposed in the inner side of the lid 5 is exposed to the outside.

The reel shafts 20A, 20B are moved to pre-set positions by a reel shaft movement mechanism 21, depending upon the sorts of video tape cassette 1 loaded on the cassette loading unit 11, so as to be fitted in the reel openings in the supply side reel 3 and the take-up side reel 2, respectively. The reel shafts 20A, 20B are run in rotation counterclockwise in FIG. 1, by a tape driving mechanism, for running the supply side reel 3 and the take-up side reel Z in rotation for taking up the magnetic tape on the peripheral surface of the take-up side reel 2, by way of performing the tape rewind operation. Thus the reel shafts 20A, 20B constitute a driving mechanism for the magnetic tape 4.

The magnetic tape is read out by the loading unit 50 from the inside of the video tape cassette 1 towards the recording/ reproducing mechanism for defining the running route of the magnetic tape 4. The loading unit 50 has a basic structure similar to that of the loading unit provided on a commonplace video tape recorder. Thus the loading unit includes a loading motor 51 and a first driving mechanism 52 driven by the loading motor 51. The loading unit also includes a ring gear portion 53 run in rotation by the first driving mechanism 52, and a second driving mechanism 54 driven by the ring gear portion 53. The loading unit also includes a first threading arm driving mechanism 55 and a second threading arm driving mechanism 56, both driven by the second driving mechanism 54, and a first threading arm 57 and a second threading arm 58, both run in rotation by the first threading arm driving mechanism 55 and a second threading arm driving mechanism 56, respectively.

The ring gear portion 53 of the loading unit 50 is run in rotation via the first driving mechanism 52 by the loading motor 51 being run in rotation. The ring gearing 53 is made up of superimposed first and second ring gears. The second driving mechanism 54 is run in rotation by the first and second ring gears being run in rotation.

The first threading arm driving mechanism 55 and the second threading arm driving mechanism 56 are run in rotation by the second driving mechanism 54 being run in rotation. When the first threading arm driving mechanism 55 and the second threading arm driving mechanism 56 are run in rotation, the first threading arm 57 and the second threading arm 58 are turned sideways, for pulling the magnetic tape 4 reeled out from the video tape cassette 1 sideways for affording a pre-set tension to the magnetic tape 4 running in the tape running path.

The magnetic tape cleaning unit 40 is made up of a suction guide arranged between a pinch roll 49 and a first threading arm 57 configured for pulling out the magnetic tape 4 from the take-up side supply side reel 3, and a blade mechanism arranged between the suction guide and the pinch roll 49. The magnetic tape cleaning unit 40 removes the dust and dirt or magnetic powders affixed to the surface of the magnetic tape 4 by air or using a sapphire blade and discharges the removed dust and dirt by air suction for discharging to outside.

The device 101 for winding the magnetic tape of the tape cassette in trim order includes a roll arm unit 108 having roll arms 214, and a roll arm movement mechanism 107 for moving the roll arm 214 with respect to the supply side reel 3. The device 101 also includes a slide movement mechanism 106 for moving the roll arm movement mechanism 107 into and out of contact with the video tape cassette 1 and a vertical movement mechanism 105 arranged in the inner side of the running path of the magnetic tape 4 for uplifting and lowering the slide movement mechanism 106 with respect to the running path of the magnetic tape 4 of the video tape cassette.

Figure 3:
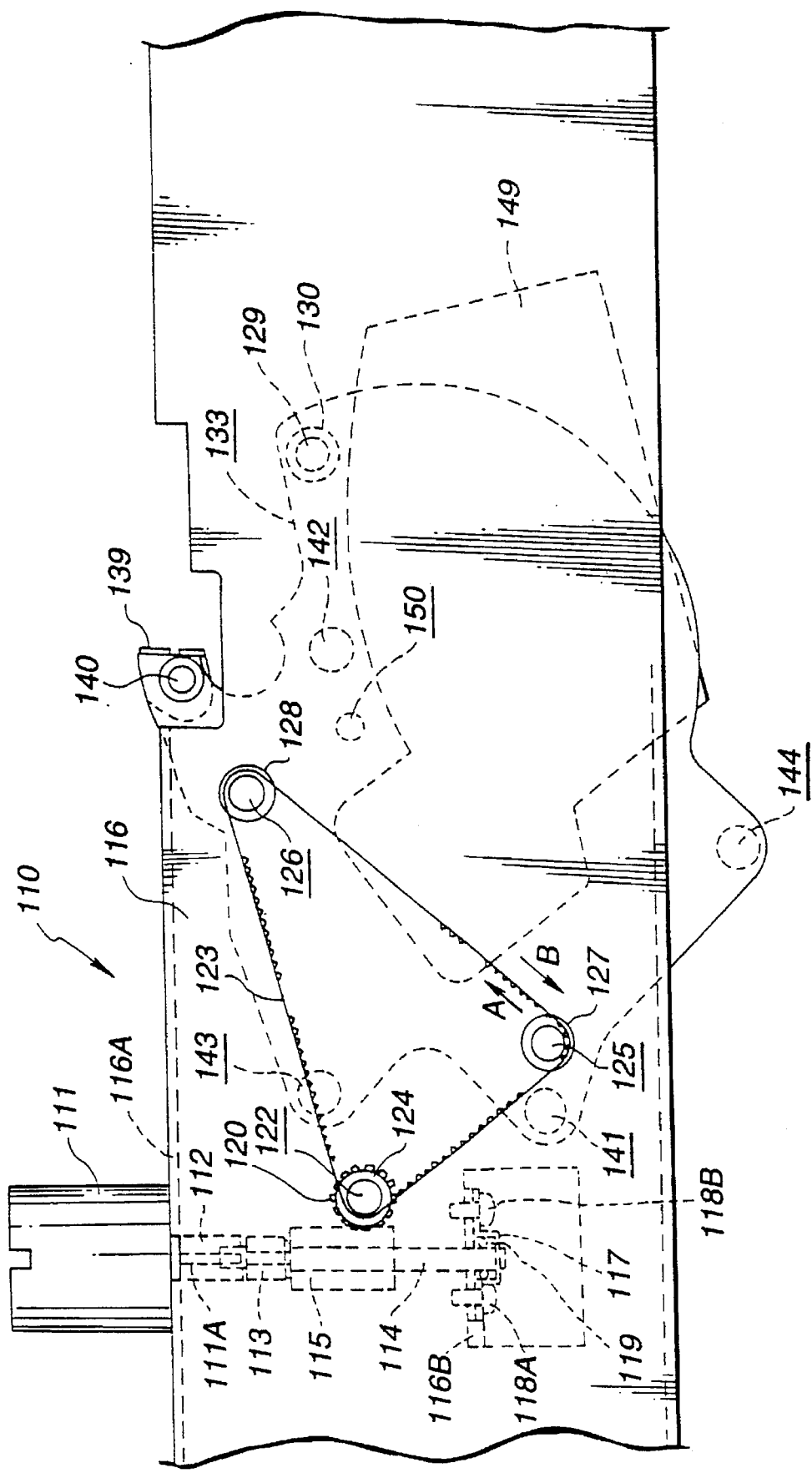
FIG. 3 is a plan view showing a vertical movement mechanism constituting the device for winding the magnetic tape of the tape cassette shown in FIG. 1.
Figure 4:
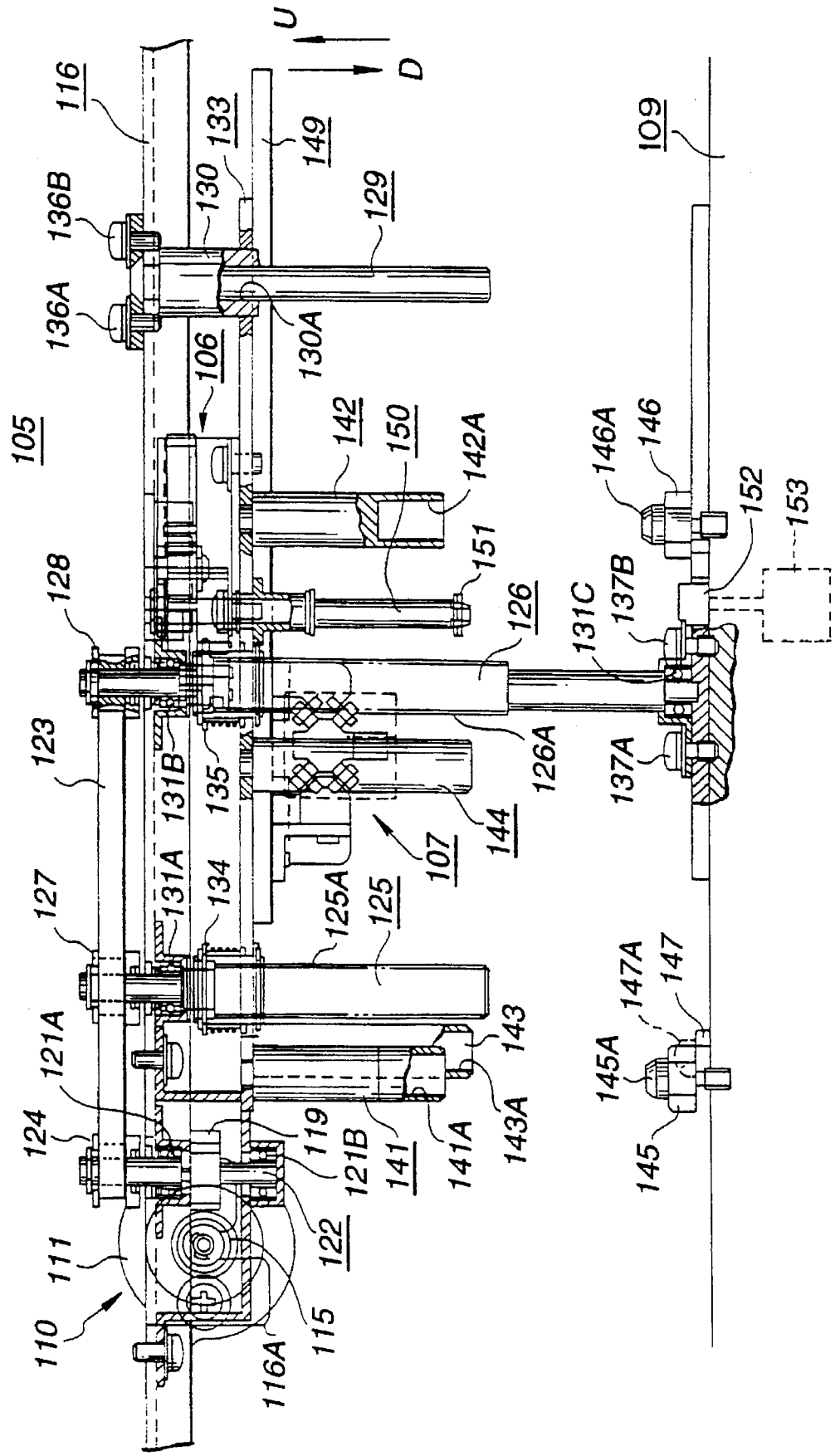
FIG. 4 is a partial cross-sectional side view for illustrating the raised position of the vertical movement mechanism constituting the device for winding the magnetic tape of the tape cassette shown in FIG. 1.
Figure 5:
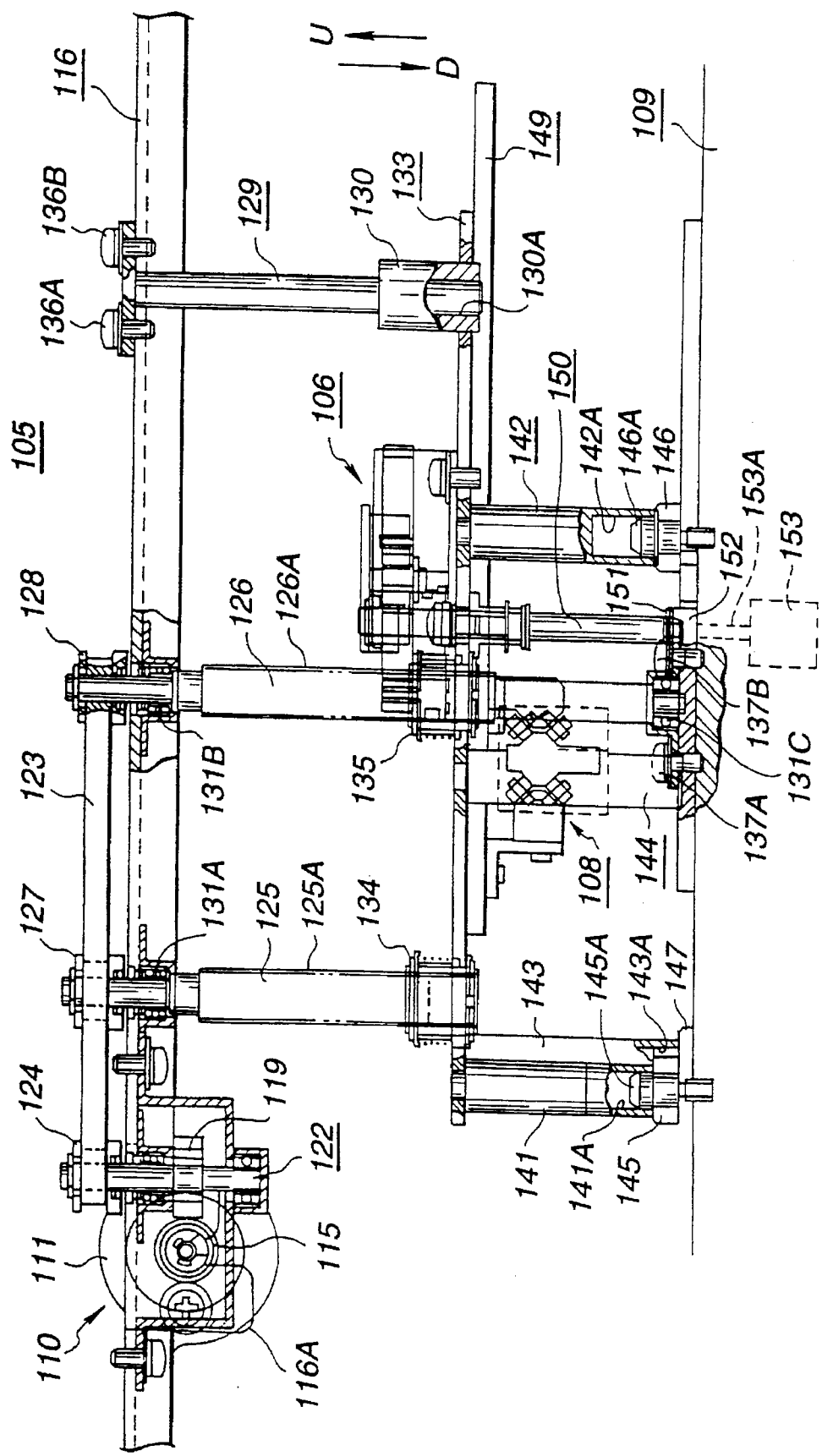
FIG. 5 is a partial cross-sectional side view for illustrating the lowered position of the vertical movement mechanism constituting the device for winding the magnetic tape of the tape cassette shown in FIG. 1.
Figure 6:
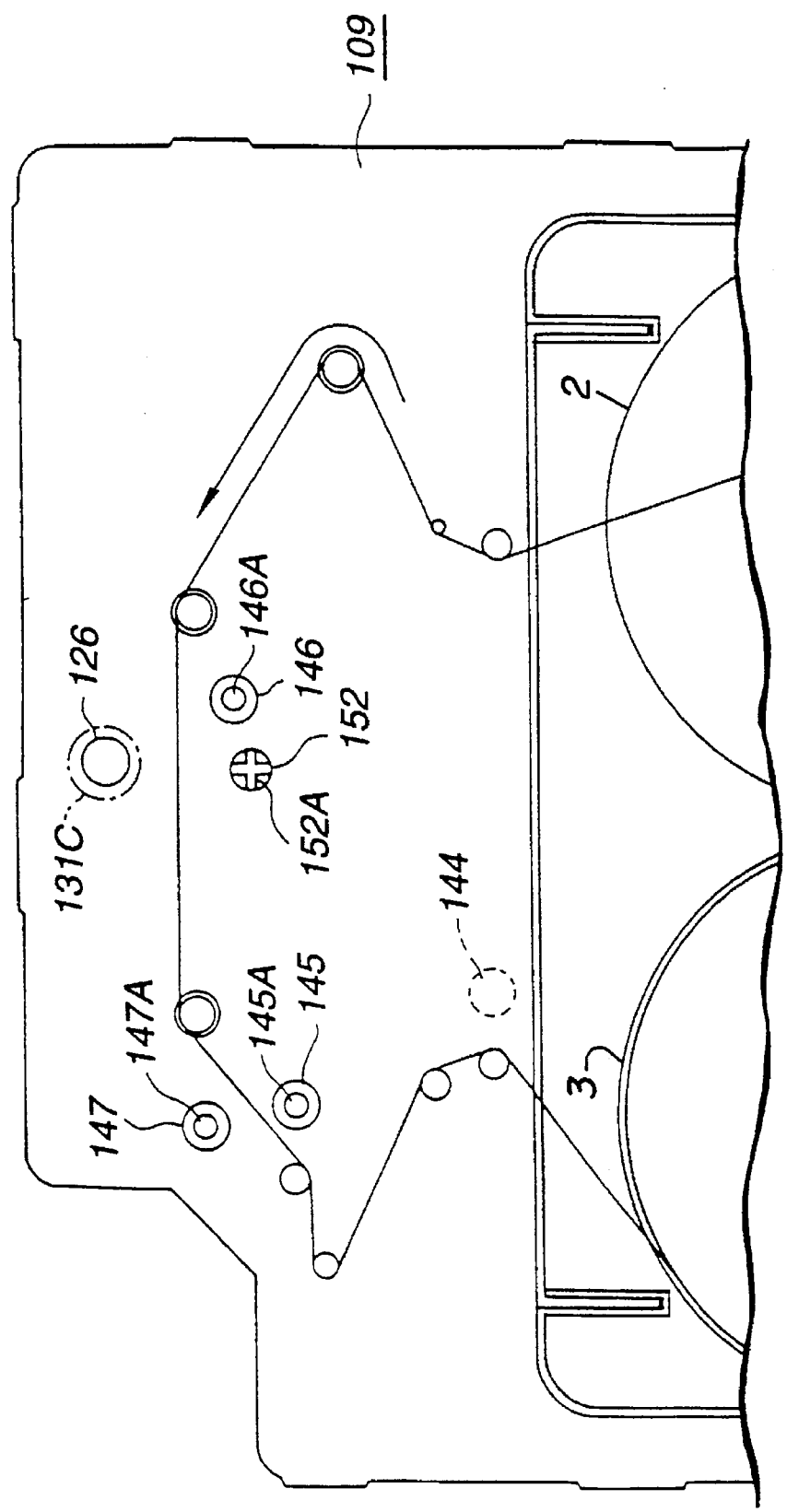
FIG. 6 is a plan view for illustrating the supporting state of the vertical movement mechanism constituting the device for winding the magnetic tape of the tape cassette shown in FIG. 1.

The vertical movement mechanism 105 is first explained by referring to FIGS. 3 to 5. The vertical movement mechanism 105 includes a supporting base 116 mounted on a chassis member of the tape evaluation device 100, and a vertical movement mechanism portion 110 provided on the supporting base 116. The vertical movement mechanism 105 also includes a vertical movement base 133 moved to an uplifted position and a lowered position by the vertical movement mechanism portion 110. The vertical movement mechanism 105 also includes first and second screw guide shafts 125, 126 for supporting the vertical movement base 133 for vertical movement, and a guide shaft 129.

The supporting base 116 is substantially rectangular in profile and has its both ends screwed to upstanding sidewall sections of a chassis member of the tape evaluating unit 100. The vertical movement mechanism portion 110 is provided on the major surface of the supporting base 116.

The vertical movement mechanism 110 includes a motor for vertical movement 111, and a worm gear 115 run in rotation by the motor 111. The vertical movement mechanism portion 110 also includes a worm wheel 120 meshing with this worm gear 115, and a driving shaft 122 carrying this worm wheel 120. The vertical movement mechanism 110 also includes a timing belt 123 placed over the driving shaft 122, and first and second screw guide shafts 125, 126 about which is placed the timing belt 123.

The motor for vertical movement 111 is mounted on a motor supporting portion 116A at a lateral end portion of the supporting base 116. A first connecting member 112 is provided on a rotary shaft 111A of the motor 111. A second connecting member 113 is fitted to the first connecting member 112. A rotary shaft 114 coaxial with the rotary shaft 111A of the motor for vertical movement 111 is provided on the second connecting member 113.

The rotary shaft 114 is provided partway with a worm gear 115 and has its one end rotatably supported by a bearing 119. The bearing 119 is arranged on a rotary shaft support 116B provided on the supporting base 116 and is covered by a bearing support member 117 having its both ends secured to the bearing support 116B by set screws 118A, 118B.

The worm gear 115 has a gearing on its outer periphery for meshing with a worm wheel 120. The worn wheel 120 is provided partway on the driving shaft 122. The driving shaft is rotatably supported by bearings 121A, 121B which are secured to the supporting base 116.

The driving shaft 122 has a pulley 124 on its upper end portion, and the timing belt 123 is placed around a groove formed in the pulley 124. The timing belt 123 is placed around pulleys 127, 128 mounted on respective upper ends of the first and second screw guide shafts 125, 126, respectively.

The guide shaft 129 has its upper end secured by set screws 136A, 136B to the supporting base 116. A guide member 130 is mounted on a vertical movement base 133 in register with the guide shaft 129 and is slidably inserted into a guide opening 130A formed in the guide member 130. Thus the vertical movement base 133 is supported for sliding movement by the guide shaft 129.

The first screw guide shaft 125 and the second screw guide shaft 128 are rotatably supported by bearings 131A, 131B provided on the supporting base 116. The second screw guide shaft 128 has its lower end rotatably supported by a bearing 131C. The bearing 131C is arranged on the outer peripheral side of the running path of the magnetic tape 4 and is secured to the base plate 109 by set screws 137A, 137B.

On the outer periphery of these the first screw guide shaft 125 and the second screw guide shaft 126 are formed tapped holes 125A, 126A into which are screwed a first guide nut 134 and a second guide nut 135, respectively.

Figure 7:
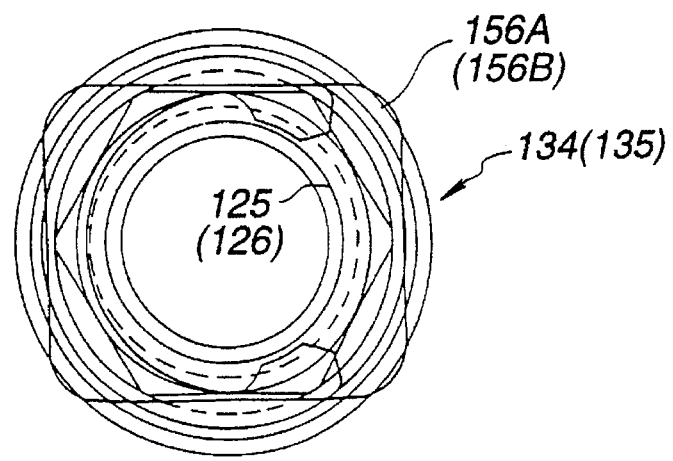
FIG. 7 is a plan view for illustrating the vertical movement mechanism constituting the device for winding the magnetic tape of the tape cassette shown in FIG. 1.
Figure 8:
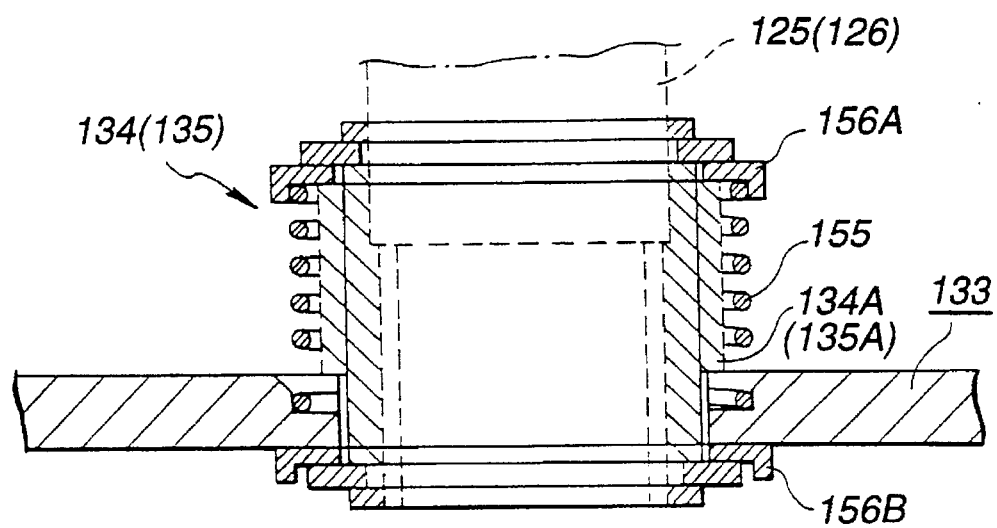
FIG. 8 is a longitudinal cross-sectional view for illustrating the vertical movement mechanism constituting the device for winding the magnetic tape of the tape cassette shown in FIG. 1.

The first guide nut 134 and the second guide nut 135 are made up of main nut portions 134A, 135A, a coil spring 155 placed around the main nut portions 134A, 135A, a first nut supporting member 156A for having the main nut portions 134A, 135A supported by the first screw guide shaft 125 and the second screw guide shaft 126, respectively, and a second nut supporting member 156B for having the main nut portions 134A, 135A supported by the vertical movement base 133, as shown in FIGS. 7 and 8.

The coil spring 155 has its one end and its other end abutted against the first nut supporting member 156A and against the vertical movement base 133, respectively. Thus the main nut portions 134A, 135A of the first guide nut 134 and the second guide nut 135 are oscillatably supported by the vertical movement base 133 in a floating state with respect to the vertical movement base 133.

The first guide nut 134 and the second guide nut 135, respectively screwed on the first screw guide shaft 125 and the second screw guide shaft 126, are provided with plural gaps with respect to the first screw guide shaft 125 and the second screw guide shaft 126.

That is, the vertical movement base 133 is slidable with respect to the first screw guide shaft 125 and the second screw guide shaft 126. The vertical movement base 133 is slid to a raised position or to a lowered position via the first guide nut 134 and a second guide nut 135 by the first screw guide shaft 125 and the second screw guide shaft 126 being run in rotation.

On the major surface of the vertical movement base 133 facing the base plate 109 of the tape evaluating unit 100, there are provided first to fourth positioning shafts 141 to 144, the upper ends of which are fixed to the vertical movement base 133.

The lower ends of the first to third positioning shafts 141 to 143 are formed with positioning holes 141A, 142A, 143A, respectively. The base plate 109 is provided with first to third positioning members 145 to 147 in register with the first to third positioning shafts 141 to 143, respectively. These first to third positioning members 145 to 147 are formed integrally with first to third positioning bosses 145A to 147A, respectively.

That is, at the lowered position of the vertical movement base 133 approaching the base plate 109, the vertical movement base 133 is positioned by the first to third positioning bosses 145A to 147A of the first to third positioning members 145 to 147 being introduced into the positioning holes 141A, 142A, 143A of the first to third positioning shafts 141 to 143, respectively.

In addition, at the lowered position of the vertical movement base 133 approaching the base plate 109, the fourth positioning shaft 144 is abutted against an abutment surface formed on the base plate 109.

On the outer periphery of the vertical movement base 133, there is formed a motor stop member 139 having a substantially L-shaped cross-section. The motor stop member has its distal end protruded towards the base plate 109 so as to be secured by a set screw 140. A descent position sensor is provided on the base plate 109 at a pre-set position associated with the motor stop member 139. The rotation of the vertical movement motor 111 is halted by the motor stop member 139 interrupting a light path to a sensor provided on the descent position sensor.

On the vertical movement base 133, there is slidably mounted a slide base 149 fitted with the roll arm unit 108 on its surface facing the base plate 109.

The vertical movement base 133 is supported in a floating fashion by the first screw guide shaft 125 and the second screw guide shaft 126 via the first guide nut 134 and the second guide nut 135, as explained previously.

Thus it becomes possible for the vertical movement mechanism 105 to automatically correct fluctuations in the distance between axes of the first screw guide shaft 125 and the second screw guide shaft 126, due to the above-described floating structure, even if there should be any deviation in parallelism between the axes of the first screw guide shaft 125 and the second screw guide shaft 126. That is, the vertical movement base 133 is moved positively between its raised position and its lowered position.

On the other hand, the vertical movement mechanism 105 is relatively free from movement losses or position deviations otherwise caused by movement of the vertical movement base 133, while screws of the first screw guide shaft 125 and the second screw guide shaft 126 and the first guide nut 134 and a second guide nut 135 may be safeguarded against abrasion.

The slide movement mechanism 106 includes a slide base 149 carrying the roll arm unit 108, a slide movement mechanism 160 for sliding the slide base 149 relative to the video tape cassette 1, and first and second position holding members 167, 168 for fixing the position of the slide base 149, as shown in FIGS. 9 to 12.

The slide base 149 is superposed on the vertical movement base 133 and is provided with the roll arm unit 108 on its major surface. First and second guide shafts 163, 164 are provided on the sliding surface between the slide base and the vertical movement base 133.

A first guide slit 161 and a second guide slit 162 are formed in the major surface of the vertical movement base 133. The first guide shaft 163 and the second guide shafts 164 of the slide base 149 are inserted into the first guide slit 161 and the second guide slit 162 of the vertical movement base 133, respectively. That is, the slide base 149 is slidably supported on the vertical movement base 133.

Figure 9:
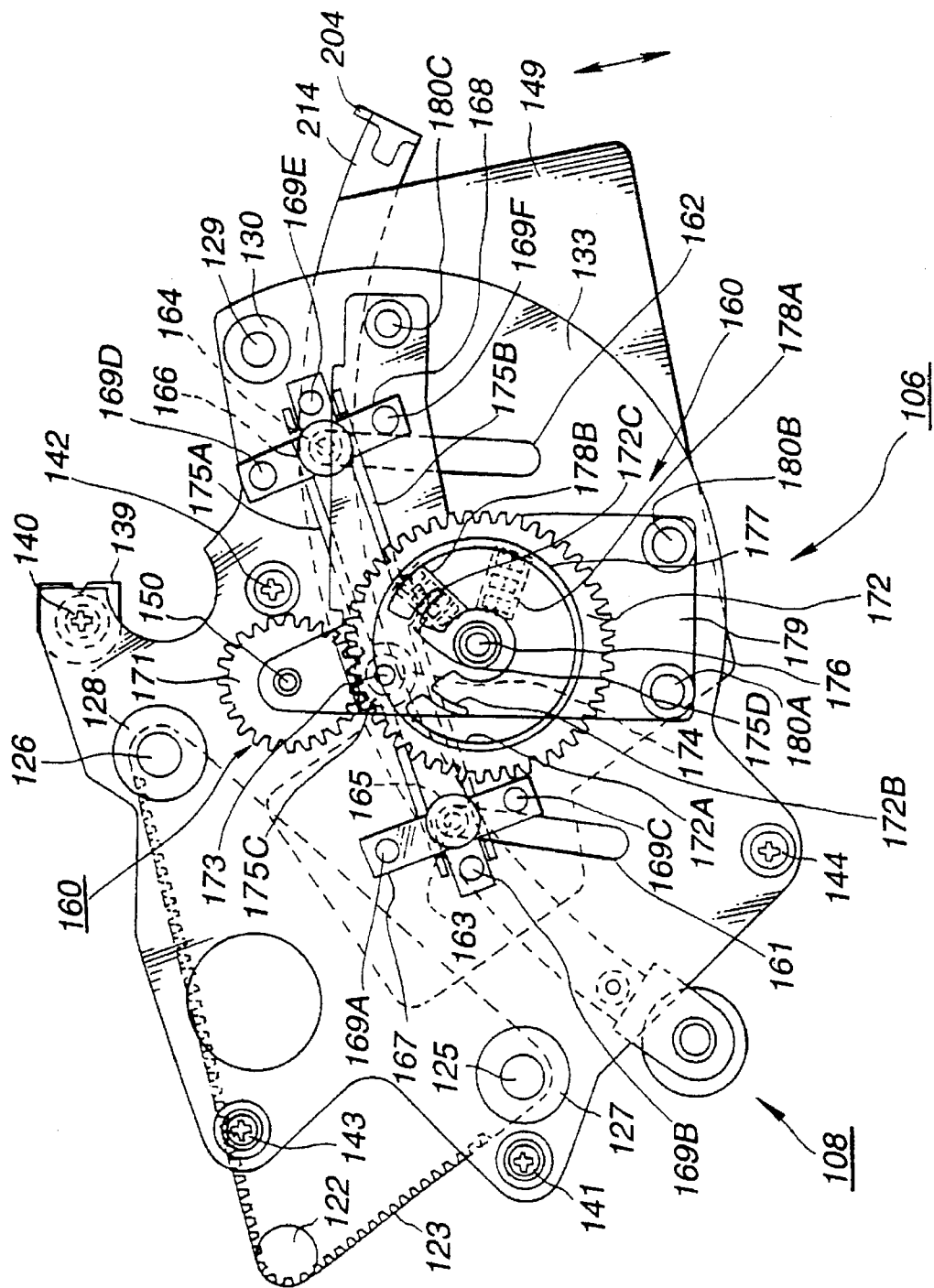
FIG. 9 is a plan view showing a slide movement mechanism constituting the device for winding the magnetic tape of the tape cassette shown in FIG. 1.
Figure 10:
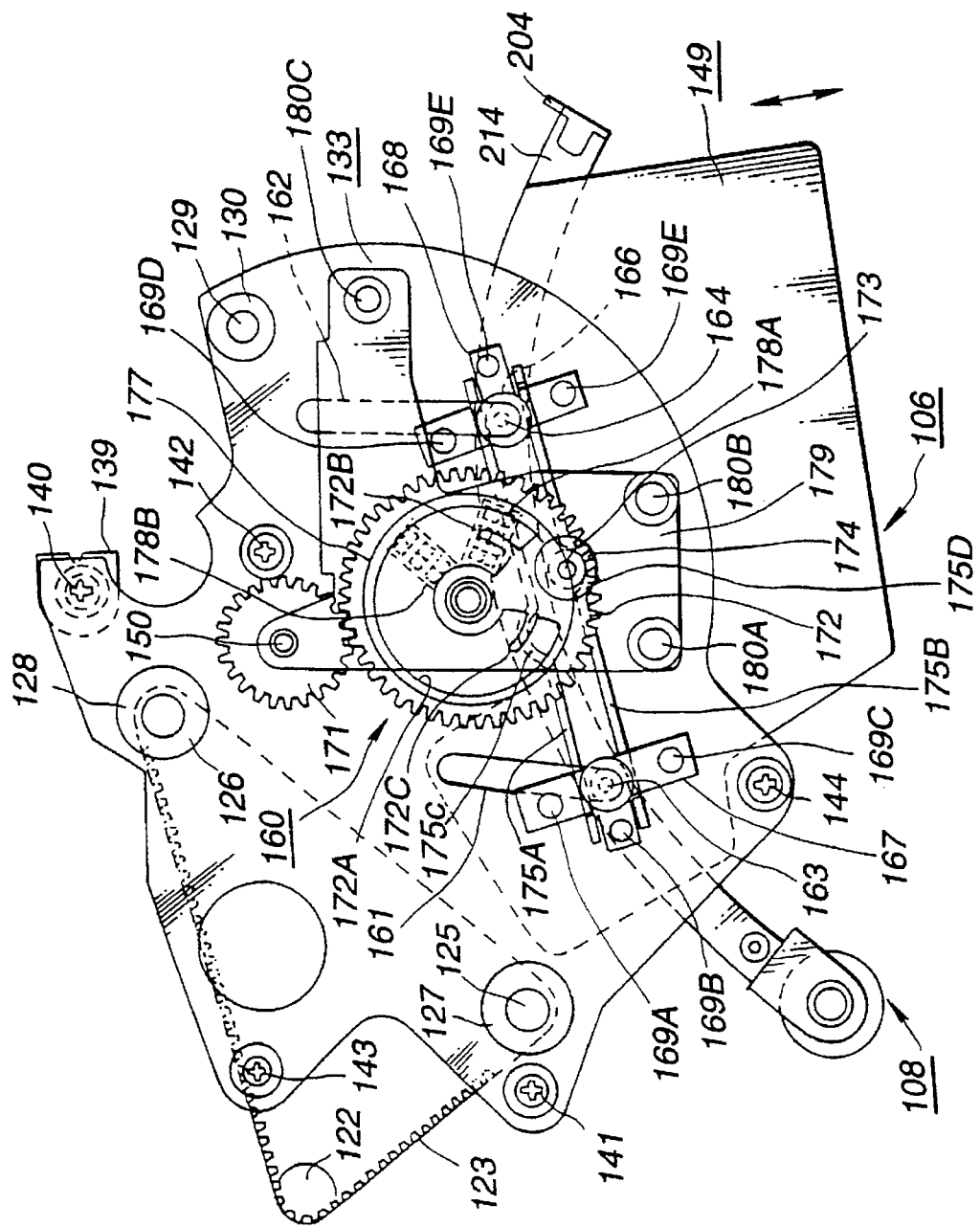
FIG. 10 is a plan view showing the slide movement mechanism constituting the device for winding the magnetic tape of the tape cassette shown in FIG. 1.
Figure 11:
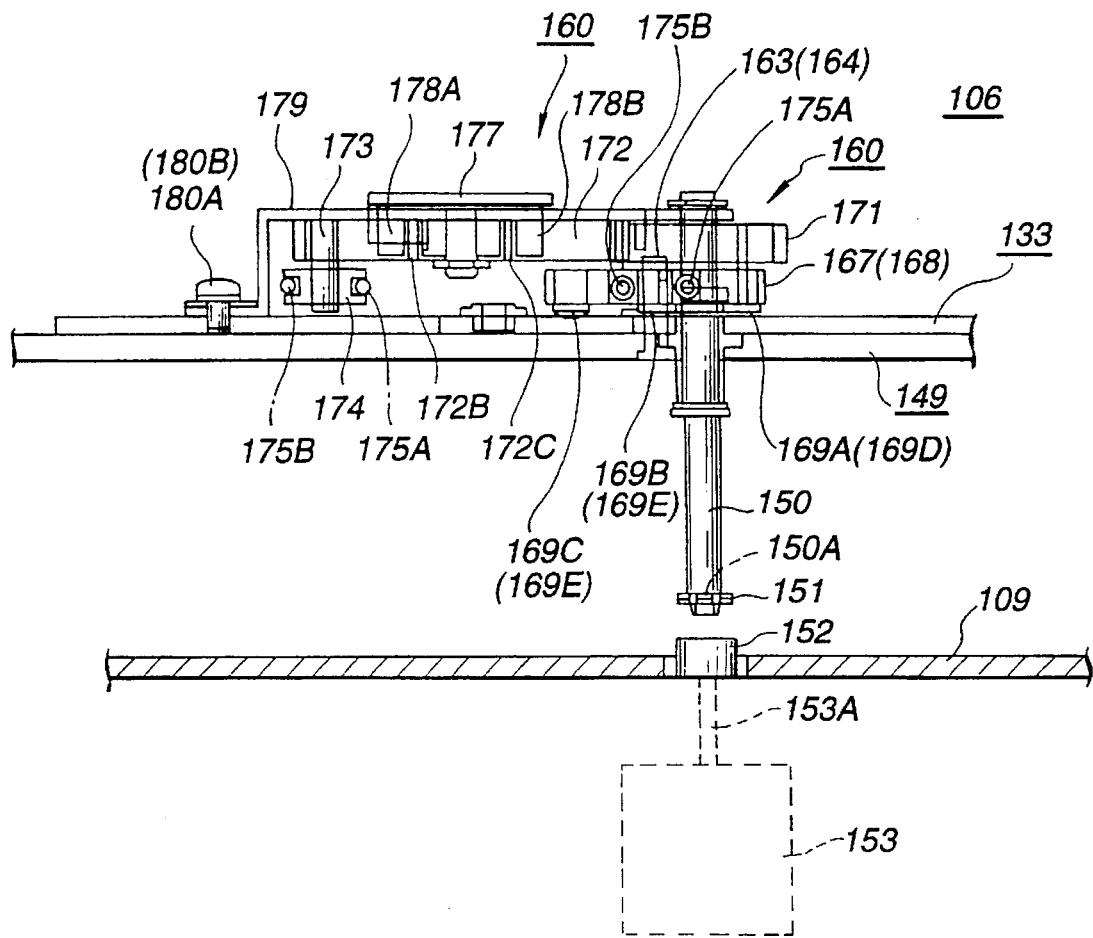
FIG. 11 is a longitudinal cross-sectional view showing the slide movement mechanism constituting the device for winding the magnet tape of the tape cassette shown in FIG. 1.

The slide movement mechanism 160 is provided on the vertical movement base 133. Referring to FIGS. 9 to 11, the slide movement mechanism 160 includes a motor for sliding movement 153, a driving shaft 150 connected to the motor for sliding movement 153, a first gear 171 provided on the driving shaft 150, a second gear 172 meshing with the first gear 172, a pulley for movement 174 mounted on the second gear 172 via a mounting shaft 173, and first and second wire members 175A, 175B mounted on both sides of the movement pulley 174.

The motor for sliding movement 153 is mounted on the base plate 109 facing the slide base 149. A connecting member 152 having a substantially cross-shaped connecting groove is mounted on the distal end of a rotary shaft 153A of the motor for sliding movement 153.

A connecting pin 151 is inserted into a mounting hole 150A formed at the lower end of the driving shaft 150. The driving shaft 150 is connected to the motor for sliding movement 153 by having a connecting pin 151 on the lower end of the shaft 150 being engaged in the connecting groove formed in the connecting member 152 provided on the motor for sliding movement 153.

The first gear 171 is mounted at the upper end of the driving shaft 150 for meshing with the second gear 172.

The second gear 172 is supported for rotation by a supporting shaft 176. A substantially C-shaped opening 172A is formed in the major surface of the second gear 172. On the lateral end portion of the opening 172A, arcuate-shaped first and second detection lugs 172B, 172C are integrally formed so as to be protruded parallel to the major surface.

The second gear 172 is provided with a sensor supporting member 177 for closing the opening 172A. The sensor supporting member is secured to the supporting shaft 176. The sensor supporting member 177 is provided with a first position sensor 178A and a second position sensor 178B at pre-set positions of the surface thereof facing the opening 172A of the second gear 172.

The first position sensor 178A and the second position sensor 178B are formed with detection grooves in register with the arcuate-shaped first and second detection lugs 172B, 172C of the second gear 172 for electrical connection with the motor for sliding movement by a connection wiring, not shown.

The mounting shaft 173 is protuberantly formed on the outer peripheral edge of the surface of the second gear 172 facing the vertical movement base 133, and is provided with the pulley for movement 174. The pulley for movement 174 has a groove extending along its outer periphery. On both sides of the pulley for movement 174, the flexible first and second wire members 175A, 175B are provided parallel to each other. The first and second wire members 175A, 175B are supported on both ends thereof by first and second position holding members 167, 168, which will be explained subsequently. The slide movement mechanism 160 is sheathed by a casing member 179, the end parts of which are secured to the vertical movement base 133 by set screws 180A, 180B, 180C.

The first and second guide shafts 163, 164 are set upright on the slide base 149 and are provided with first and second pulleys 165, 166, respectively. These first and second pulleys 165, 166 are provided with first and second position holding members 167, 168, respectively.

These first and second position holding members 167, 168 are formed of plastics material substantially in the T-shape. The respective end portions of the first and second position holding members 167, 168 are provided with first to third abutment members 169A to 169C and fourth to sixth abutment members 169D to 169F, respectively.

Figure 12:
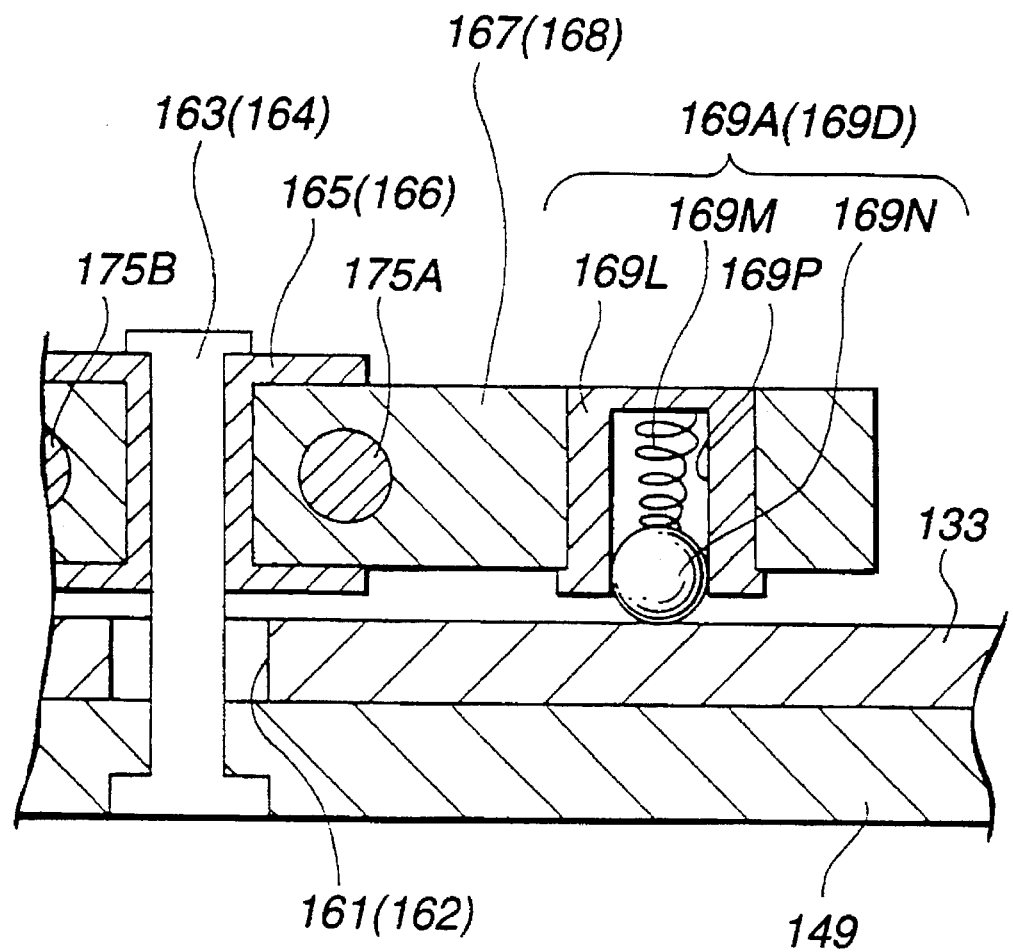
FIG. 12 is a longitudinal cross-sectional view for illustrating a pressure contact member of the slide movement mechanism constituting the device for winding the magnetic tape of the tape cassette shown in FIG. 1.

Each of the first to sixth abutment members 169A to 169F includes a main body portion 169L, a coil spring 169M housed within the main body portion 169L and a steel ball 169N provided at one end of the coil spring 169M, as shown in FIG. 12.

The main body portion 189L is substantially in the form of a bottomed cylinder having an opening 189P in which the coil spring M is accommodated. The coil spring 189M has its one end abutted against the bottom of the opening 189P. The steel ball 189N is accommodated in the opening 189P at the opening end thereof so as to be abutted against the end of the coil spring 189M.

Thus, with each of the first to sixth abutment members 189A to 169F, the respective steel balls 189N are abutted against the major surface of the vertical movement base 133 so as to be intruded into the opening 189P. By the steel ball 169P being intruded into the opening 169P, the coil spring 169M is elastically deformed for elastically loading the first to sixth abutment members 169A to 169F. Thus the vertical movement base 133 is subjected to contact pressure from the steel ball 169N of each of the first to fourth abutment members 169A to 169F. That is, since the vertical movement base 133 is subjected to the contact pressure from the first to fourth abutment members 169A to 169F, there is positively no risk of a gap being generated in the sliding surface between the vertical movement base and the slide base 149, thus assuring an optimum sliding movement of the slide base 149 with respect to the vertical movement base 133.

Since the slide movement mechanism 106 has the first and second wire members 175A, 175B, both ends of which are supported by the first and second position holding members 167, 168, respectively, the spring force of the first and second wire members 175A, 175B is afforded to the slide base 149 in the slid position.

Thus the slide base 149 in the slid position may be slidably secured under the spring force of the first and second wire members 175A, 175B of the slide movement mechanism 106.

Figure 13:
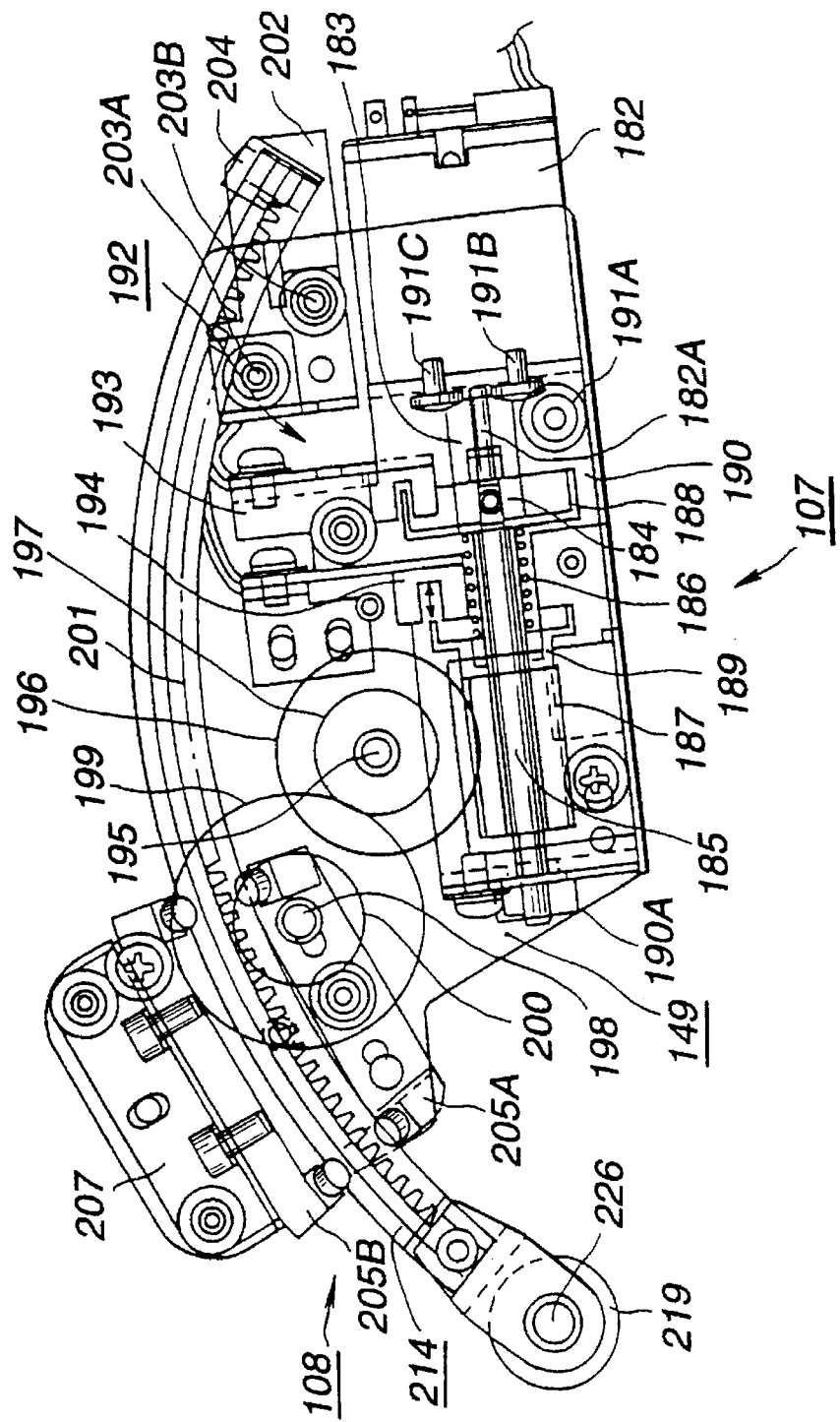
FIG. 13 is a plan view showing a roll arm movement mechanism constituting the device for winding the magnetic tape of the tape cassette shown in FIG. 1, with an outer cover being removed for showing the internal structure.
Figure 14:
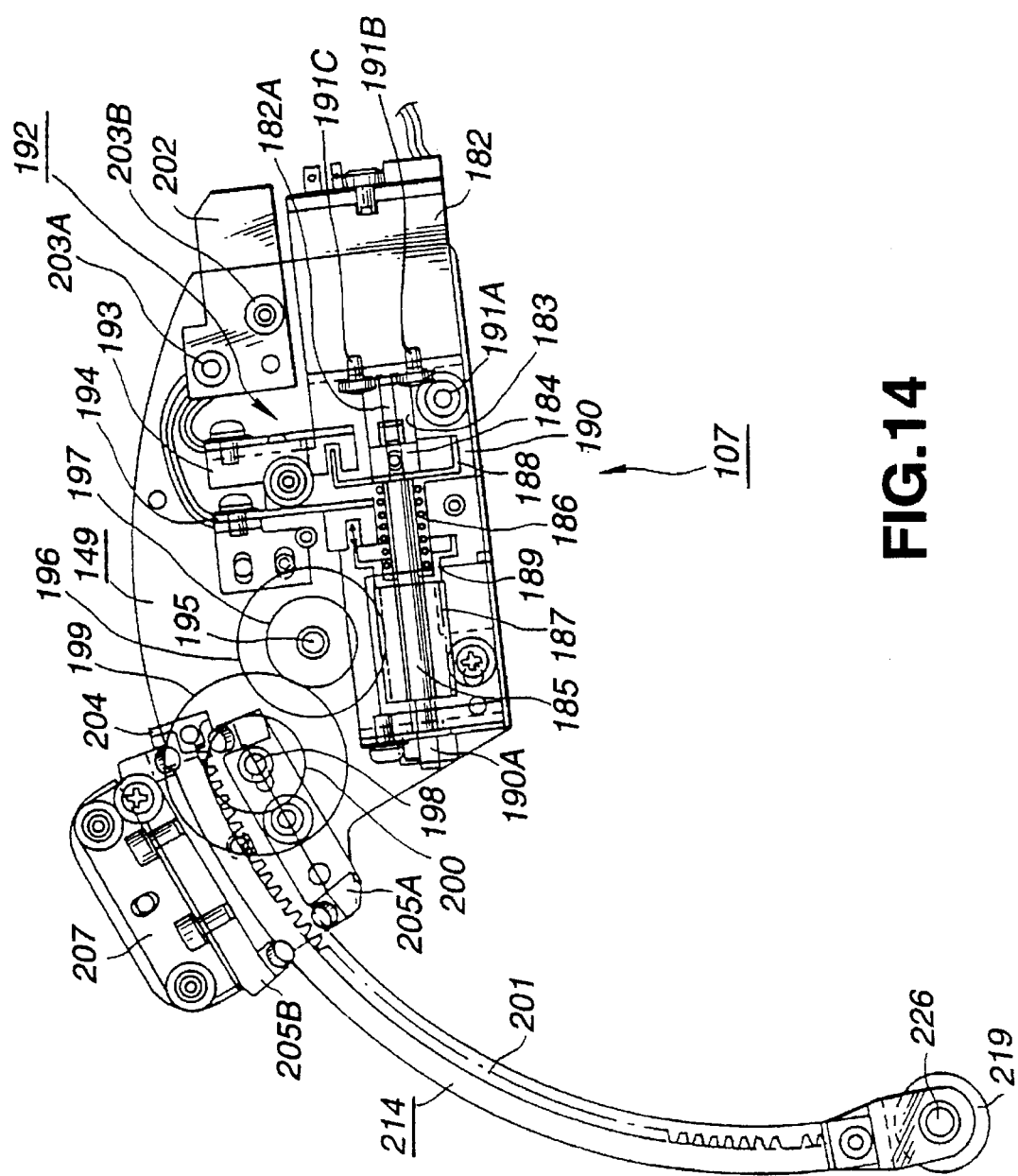
FIG. 14 is a plan view similar to FIG. 13, showing a roll arm movement mechanism constituting the device for winding the magnetic tape of the tape cassette shown in FIG. 1, with an outer cover being removed for showing the internal structure.
Figure 15:
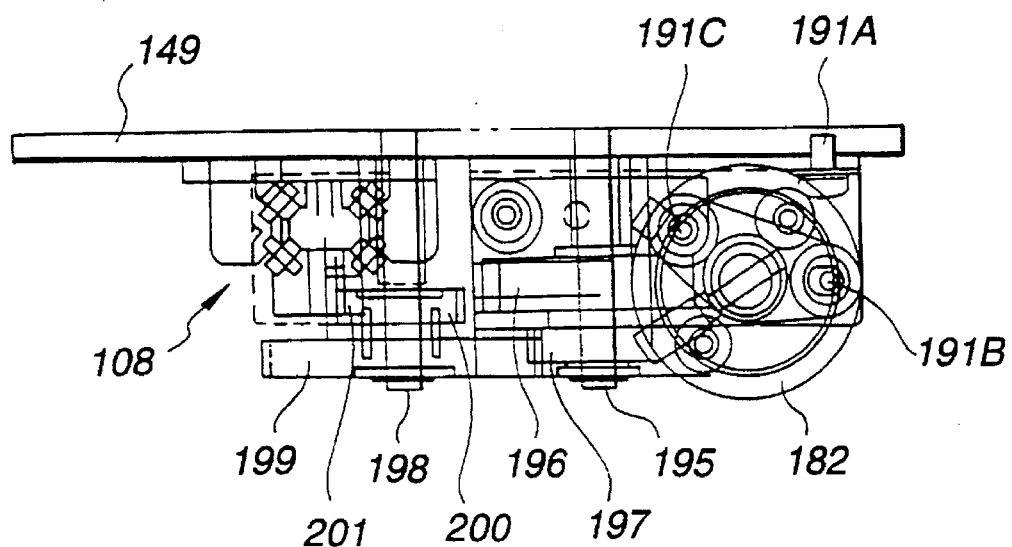
FIG. 15 is a side view showing a roll arm movement mechanism constituting the device for winding the magnetic tape of the tape cassette shown in FIG. 1, with an outer cover being removed for showing the internal structure.
Figure 16:
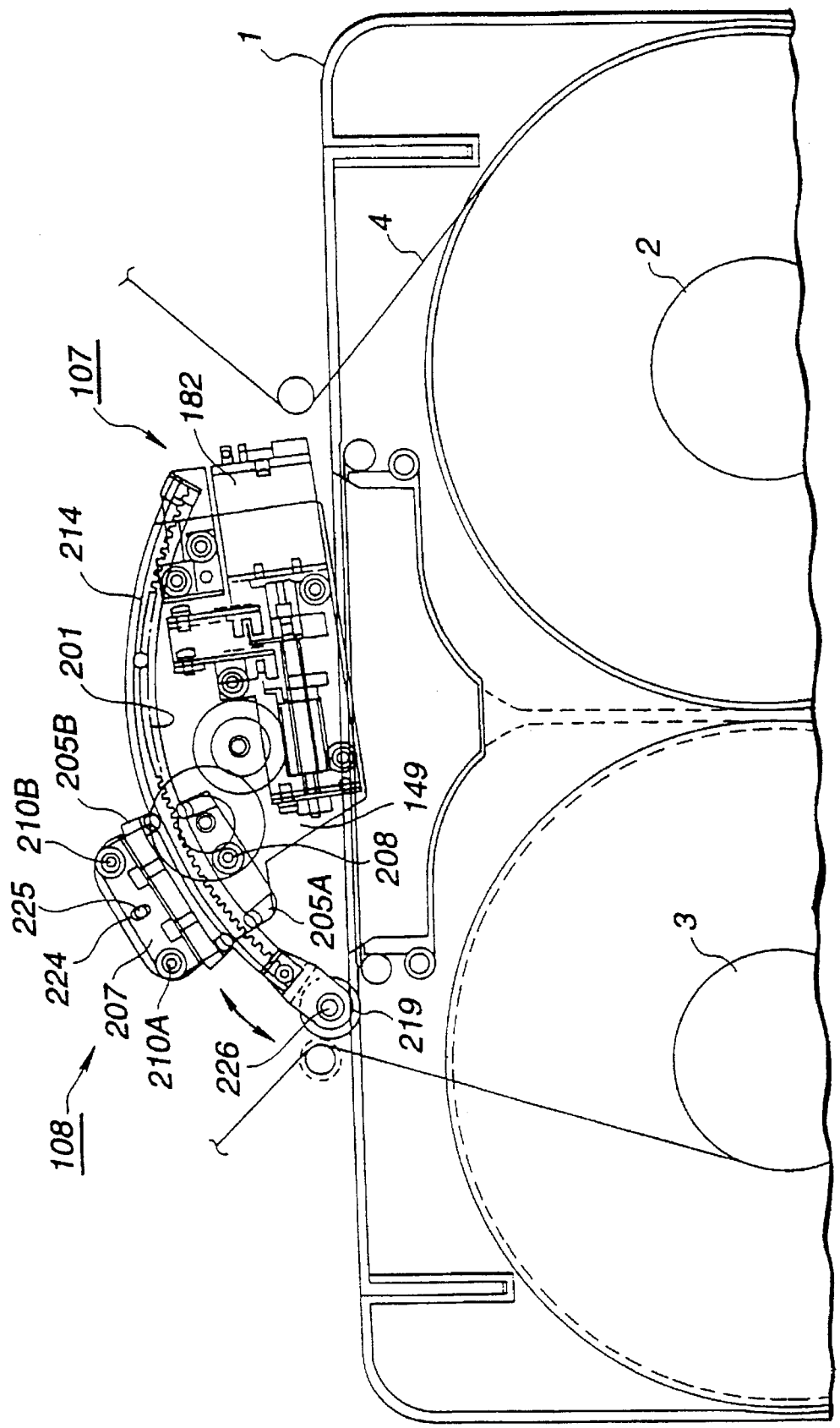
FIG. 16 is a plan view showing a roll arm unit constituting the device for winding the magnetic tape of the tape cassette shown in FIG. 1.
Figure 17:
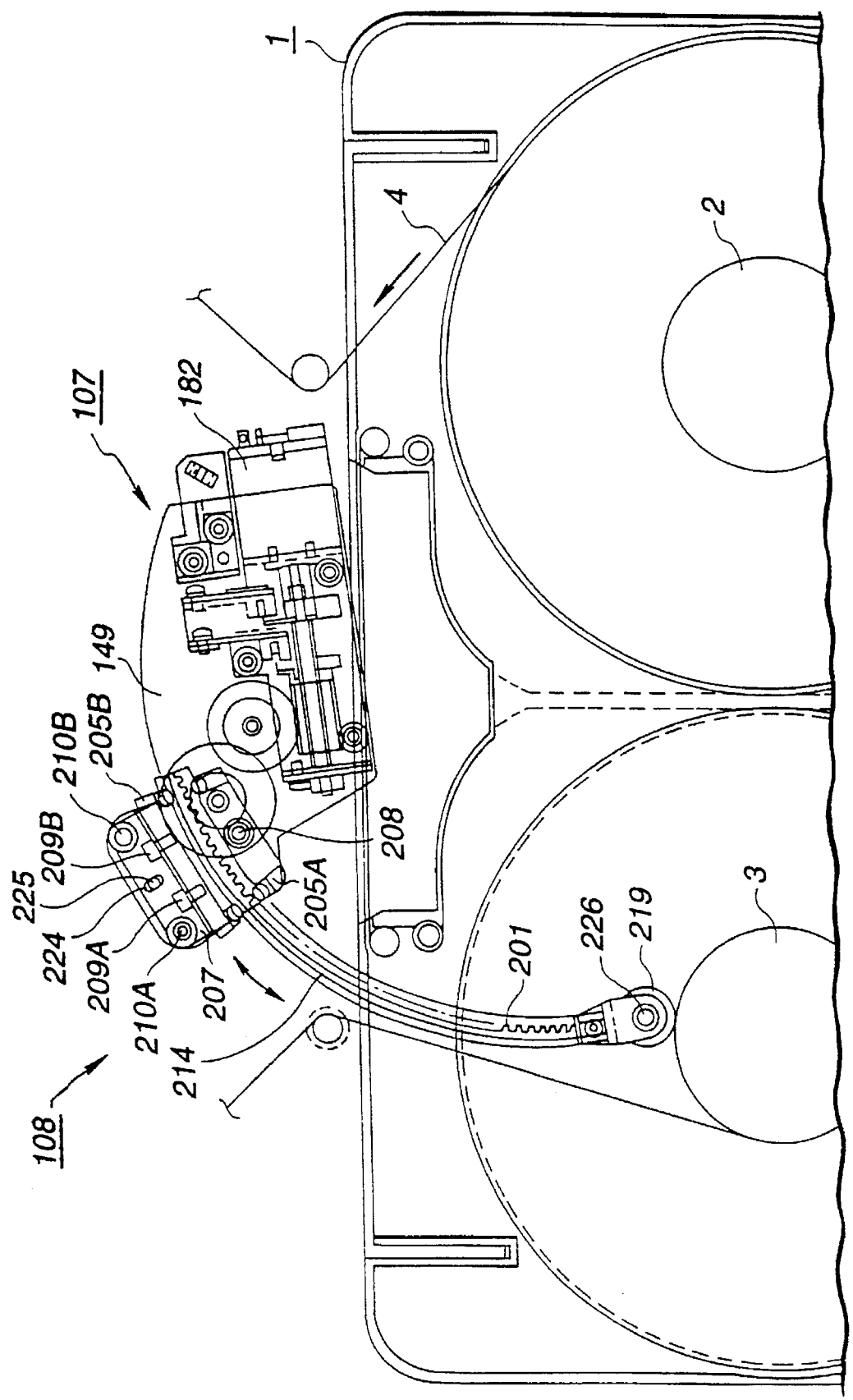
FIG. 17 is a plan view similar to FIG. 16, showing the roll arm unit constituting the device for winding the magnetic tape of the tape cassette shown in FIG. 1.

The roll arm movement mechanism 107 includes a roll arm mechanism 192 provided on the slide base 149 for moving a roll arm 214, a circuit substrate 202 controlling the roll arm mechanism 192, and a contact pressure sensor 193 and an overload sensor 194 both connected to the circuit substrate 202, as shown in FIGS. 13 to 15.

The roll mechanism 192 includes a roll arm movement motor 182, a driving shaft 185 connected to a rotary shaft 182A of the roll arm movement motor 182, a worm gear 187 provided on the driving shaft 185, a first gear 196 meshing with the worm gear 187, a second gear 197 provided on a supporting shaft 195 for the first gear 196, a third gear 199 meshing with the second gear 197, a fourth gear 200 provided on a supporting shaft 198 of the third gear 199, and a gearing 201 provided on the roll arm for meshing with the fourth gear 200.

The roll arm movement motor 182 is secured with set screws 191B, 191C to a mechanism supporting member 190 in turn secured to the slide base 149 with set screws 191A. The roll arm movement motor 182 has a rotary shaft 182A the distal end of which has the first connecting member 183.

The first connecting member 183 is connected to a second connecting member 184 by means of which the first connecting member is connected to one end of the driving shaft 185. The opposite end of the driving shaft 185 is fitted with a worm gear 187 so as to be supported for rotation with respect to a driving shaft supporting portion 190A provided on the mechanism supporting member 190.

The worm gear 187 meshes with the first gear 196. The worm gear 187 meshes with the first gear 196 which is provided partway on the first supporting shaft 195 rotatably supported by the slide base 149. The second gear 197 is provided on the distal end of the first supporting shaft 195.

The second gear 197 meshes with the third gear 199. The third gear 199 is provided on the distal end of the second supporting shaft 198 rotatably supported by the slide base 149. The fourth gear 200 is provided partway on the second supporting shaft 198.

The gear 201 is formed extending along a lateral side of a roll arm 214 provided on the roll arm unit 108 as later explained. The gear 201 meshes with the fourth gear 200. A descent-preventing plate 204 is provided on the distal end of the roll arm 214 for preventing descent on sliding movement.

The circuit substrate 202 is secured to the outer periphery of the slide base 149 by set screws 203A, 203B. The circuit substrate 202 is connected by a connection wiring to the contact pressure sensor 193 and the overload sensor 194, while being also connected to the roll arm movement motor 182.

Each of the contact pressure sensor 193 and the overload sensor 194 has its proximal end screwed to the slide base 149, while having its distal end formed with a detection slit. The driving shaft 185 is provided with a contact pressure detection member 188 and an overload detecting member 189 in register with the contact pressure sensor 193 and the overload sensor 194, respectively.

The contact pressure detection member 188 is formed substantially as a bottomed cylinder and has plural slits on its outer peripheral surface. The contact pressure detection member 188 is secured to the driving shaft 185 by having its outer peripheral portion inserted into detection slits formed in the contact pressure sensor 193.

The contact pressure sensor 193 detects the number of revolutions of the driving shaft 185 by the driving shaft 185 being run in rotation and by the outer periphery of the contact pressure detection member 188 hiding the detection slit. The contact pressure sensor 193 controls the rpm of the roll arm movement motor 182 based upon the detected rpm of the driving shaft 185.

Thus the contact pressure sensor 193 controls the arm of the roll arm movement motor 182 for adjusting the amount of movement of the roll arm 214. That is, when the roll arm 214 is abutted against the magnetic tape 4 taken up on the supply side reel 3, the pressure contact sensor 193 causes the roll arm 214 to be moved properly responsive to increase in the winding diameter of the magnetic tape 4 taken up on the supply side reel 3 for perpetually maintaining a constant contact pressure of the roll arm 214 on the magnetic tape 4.

The overload detection member 189 is substantially in the form of a bottomed cylinder and is slidably supported on the driving shaft 185 with the outer periphery of the cylinder being in register with the detection slit in the overload sensor 194. The driving shaft 185 is provided with a coil spring 186 acting between the contact pressure detection member 188 and the overload detection member 189. The coil spring 186 acts on both ends thereof against the contact pressure detection member 188 and the overload detection member 189.

Consequently, since the contact pressure detection member 188 is secured to the driving shaft 185, the overload detection member 189 is receded out of the detection slit in the overload sensor 194 under the spring force of the coil spring 186. If an overload is produced in the contact pressure force of the roll arm 214 pressed against the magnetic tape 4, the worm gear 187 is slid via the first gear 196 to the fourth gear 200 so that the overload detection member 189 is slid by the worm gear 187 towards the overload sensor 194.

The overload detection member 189, thus slid, has its outer peripheral portion introduced into the detection slit formed in the overload sensor 194. Thus the overload sensor 194 detects the overload generated in the roll arm 214 for immediately stopping the rotation of the roll arm movement motor 182.

As described above, it is possible for the roll arm movement mechanism 107 to accurately adjust the amount of movement of the roll arm movement motor 182 by the gear 201 formed on a lateral surface of the roll arm 214. Thus the roll arm movement mechanism 107 is responsive to changes in the winding diameter of the magnetic tape 4 taken up on the supply side reel 3 for shifting the roll arm 214 precisely. Thus the roll arm 214 is pressure-contacted at all times with the magnetic tape 4 taken up on the supply side reel 3 of the video tape cassette 1 under a constant contact pressure.

The roll arm movement mechanism 107 also detects the rpm of the roll arm movement motor 182 with the aid of the contact pressure sensor 193 and the contact pressure detection member 189. It is possible for the roll arm movement mechanism 107 to detect the rpm of the roll arm movement motor 182 and hence the contact pressure of the touch roll 219 on the magnetic tape 4. That is, the contact pressure sensor 193 is responsive to changes in the winding diameter of the magnetic tape 4 taken up on the supply side reel 3 for properly adjusting the amount of movement of the roll arm 214 for assuring a constant contact pressure of the roll arm 214 on the magnetic tape 4.

If an overload is produced on the roll arm 214 pressed against the supply side reel 3, the roll arm movement mechanism 107 stops the rotation of the roll arm movement motor 182 instantly with the aid of the overload sensor 194 and the overload detecting member 189. Thus the roll arm movement mechanism 107 positively prohibits the magnetic tape 4 from being destroyed under an overload generated in the roll arm 214 pressed against the magnetic tape 4.

Thus it is possible with the roll arm movement mechanism 107 to remove an air layer included between it and the magnetic tape 4 taken up on the supply side reel 3 positively and to prohibit the magnetic tape 4 from being destroyed under the contact force exerted by the roll arm 214.

The roll arm unit 108 includes a roll arm supporting member 205 provided on the slide base 149, first to eighth bearings 213A to 213H provided on the roll arm supporting member 205, a roll arm 214 slidably supported on the first to eighth bearings 213A to 213H and a touch roll 219 rotatably carried by one end of the roll arm 214, as shown in FIGS. 16 to 19.

The roll arm supporting member 205 is made up of a first roll arm supporting member 205A arranged on the slide base 149 on the inner surface of the roll arm 214 and a second roll arm supporting member 205B arranged on the slide base 149 on the outer surface of the roll arm 214.

The first roll arm supporting member 205A is substantially U-shaped in cross-section and has its bottom surface secured to the slide base 149 by a set screw 208. The bottom surface of the first roll arm supporting member 205A is formed with a position adjustment slit 222 into which is inserted a guide pin 223 mounted upright on the slide base 149.

The surface of the first roll supporting member 205A facing the roll arm 214 as later explained is formed with mutually perpendicular inclined portions 220A, 220B. The first roll arm supporting member 205A is formed at one end portions of the inclined portions 220A, 220B thereof with first and second bearing mounting holes 211A, 211B having respective axes extending perpendicular to each other.

At the opposite ends of the inclined portions 220A, 220B of the first roll arm supporting member 205A, third and fourth bearing mounting holes 211C, 211D are formed so that the respective axes run at right angles to each other.

The first bearing mounting hole 211A and the third bearing mounting hole 211C are formed in the inclined portion 220A of the first roll arm supporting member 205A on a circumference of a circle centered about a center of curvature R of the roll arm 214. The second bearing mounting hole 211B and the fourth bearing mounting hole 211D are formed in the inclined portion 220B of the first roll arm supporting member 205A on a circumference of a circle centered about a center of curvature R of the roll arm 214.

The first roll arm supporting member 205A is provided with first to fourth bearing supporting shafts 212A to 212D introduced into the first to fourth bearing mounting holes 211A to 211D. First to fourth washers 221A to 221D are inserted in these first to fourth bearing supporting shafts 212A to 212D, while the first to fourth bearings 213A to 213D are rotatably supported in the bearing supporting shafts 213A to 213D.

The second roll arm supporting member 205B is provided on the slide base 149 via a flexible pressure contact member 207 which is L-shaped in cross-section. The second roll arm supporting member 205B is secured by set screws 209A, 209B to one end of the pressure contact member 207, the other end of which is secured by set screws 210A, 210B to the slide base 149.

The surface of the second roll arm supporting member 205B facing the roll arm 214 as later explained is formed with mutually perpendicular inclined portions 206A, 206B. The second roll arm supporting member 205B is formed at one end portions of the inclined portions 206A, 206B thereof with fifth and sixth bearing mounting holes 211E, 211F having respective axes extending perpendicular to each other.

At the opposite ends of the inclined portions 206A, 206B of the first roll arm supporting member 205B, seventh and eighth bearing mounting holes 211G, 211H are formed so that the respective axes run at right angles to each other.

The fifth bearing mounting hole 211E and the seventh bearing mounting hole 211G are formed in the inclined portion 206A of the second roll arm supporting member 205B on a circumference of a circle centered about a center of curvature R of the roll arm 214. The sixth bearing mounting hole 211F and the eighth bearing mounting hole 211H are formed in the inclined portion 206B of the second roll arm supporting member 205B on a circumference of a circle centered about a center of curvature R of the roll arm 214.

The second roll arm supporting member 205B is provided with fifth to eighth bearing supporting shafts 212E to 212H introduced into the fifth to eighth bearing mounting holes 211E to 211H. Fifth to eighth washers 221E to 221H are inserted in these fifth to eighth bearing supporting shafts 212E to 212H, while the first to fourth bearings 213E to 213H are rotatably supported in the bearing supporting shafts 213E to 213H.

The pressure contact member 207 supporting the second roll arm supporting member 205B has a position adjustment slit 224 on its bottom surface. Into this position adjustment slit 224 is inserted a guide pin 225 set upright on the slide base 149. The pressure contact member 207 affords a contact pressure force of pressing the second roll arm supporting member 205B against the roll arm 214.

Figure 18:
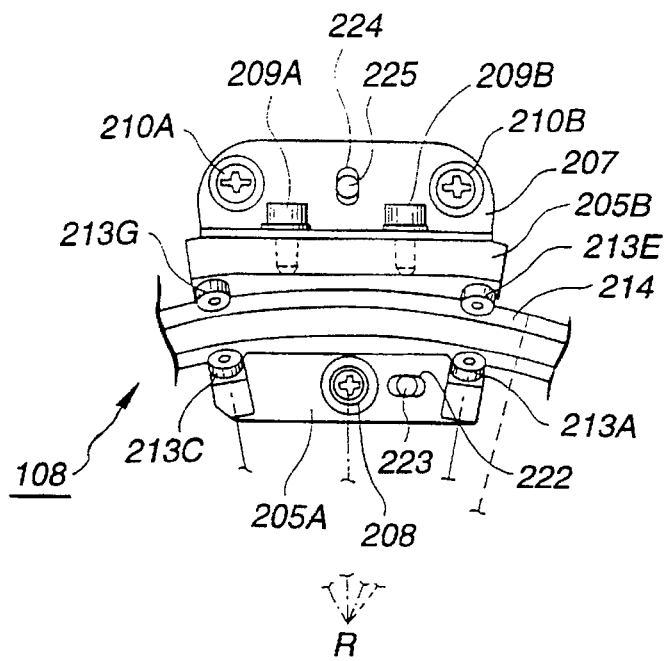
FIG. 18 is a partial plan view showing the roll arm unit constituting the device for winding the magnetic tape of the tape cassette shown in FIG. 1.
Figure 19:
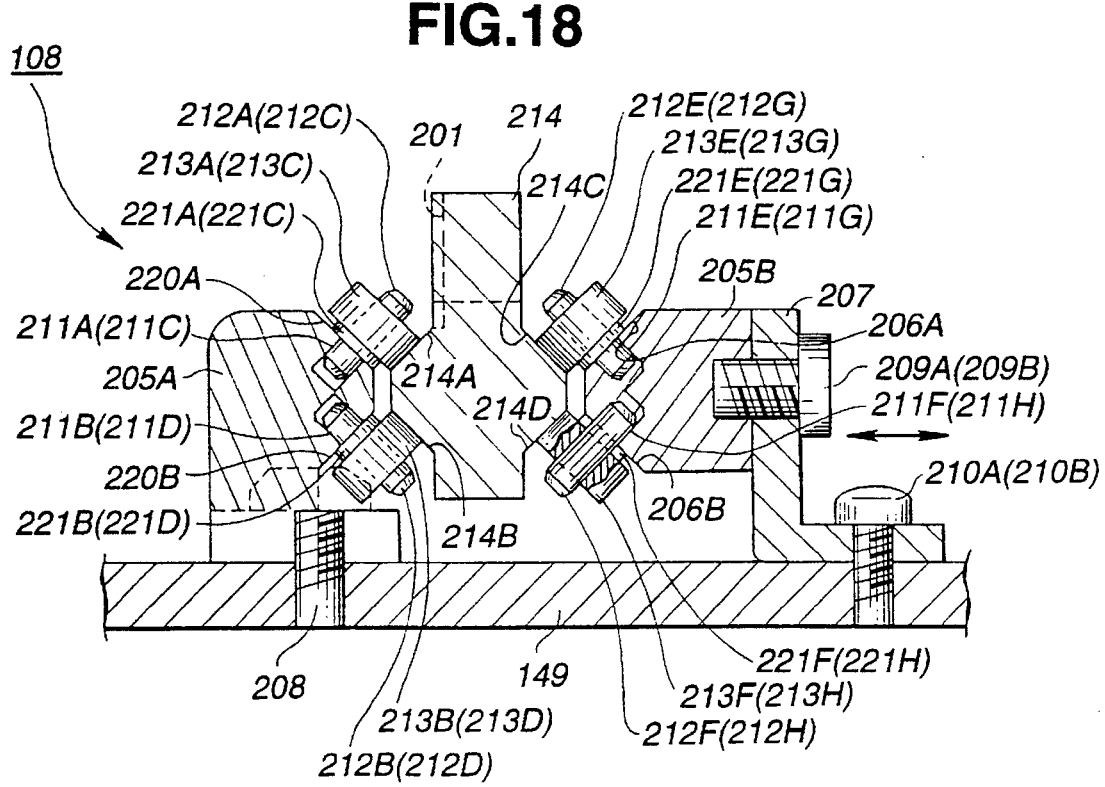
FIG. 19 is a longitudinal cross-sectional view showing the roll arm unit constituting the device for winding the magnetic tape of the tape cassette shown in FIG. 1.

The roll arm 214 is formed as an arc of a circle having a center of curvature R as the center and mutually perpendicular first and second sliding surfaces 214A, 214B are integrally formed on the inner lateral surfaces thereof, as shown in FIG. 18. The roll arm 214 is formed with mutually perpendicular third and fourth sliding surfaces 214C, 214D on the outer lateral surface of the roll arm 214.

The roll arm 214 has its sliding surfaces 214A to 214D sliadably supported by the first to eighth bearings 213A to 213H provided on the first and second roll arm supporting members 205A and 205B.

The gear portion meshing with the fourth gear 200 of the roll arm movement mechanism 107 is provided for extending along the inner peripheral surface of the roll arm 214. The touch roll 219 is rotatably supported by a supporting shaft 226 provided on one end of the roll arm 214.

By the provision of the roll arm 214 having the shape of an arc having the center of curvature R as the center, the line of force of the contact pressure applied by the roll arm unit 108 to the magnetic tape 4 taken up on the supply reel 3 traverses the center of rotation of the supply reel 3. Thus the roll arm 214 diminishes the effects of excess tightness or slack generated in the magnetic tape 4 taken up on the supply reel 3 for improving the winding state of the magnetic tape 4.

On the other hand, since the roll arm 214 is arcuately-shaped, the distance between the end side tape guide and the inner tape guide provided in the tape cassette 1 may be effectively utilized, while the distance of movement may also be diminished, when the roll arm 214 is in pressure contact with the magnetic tape 4 taken up on the supply side reel 3.

Thus the running path of the magnetic tape 4 may be reduced as to the pull-out area by the loading unit 50. Thus the roll arm 214 contributes to reduction in size of the device for taking up the video tape in a good condition 101 and the tape evaluating device 100.

Figure 20:
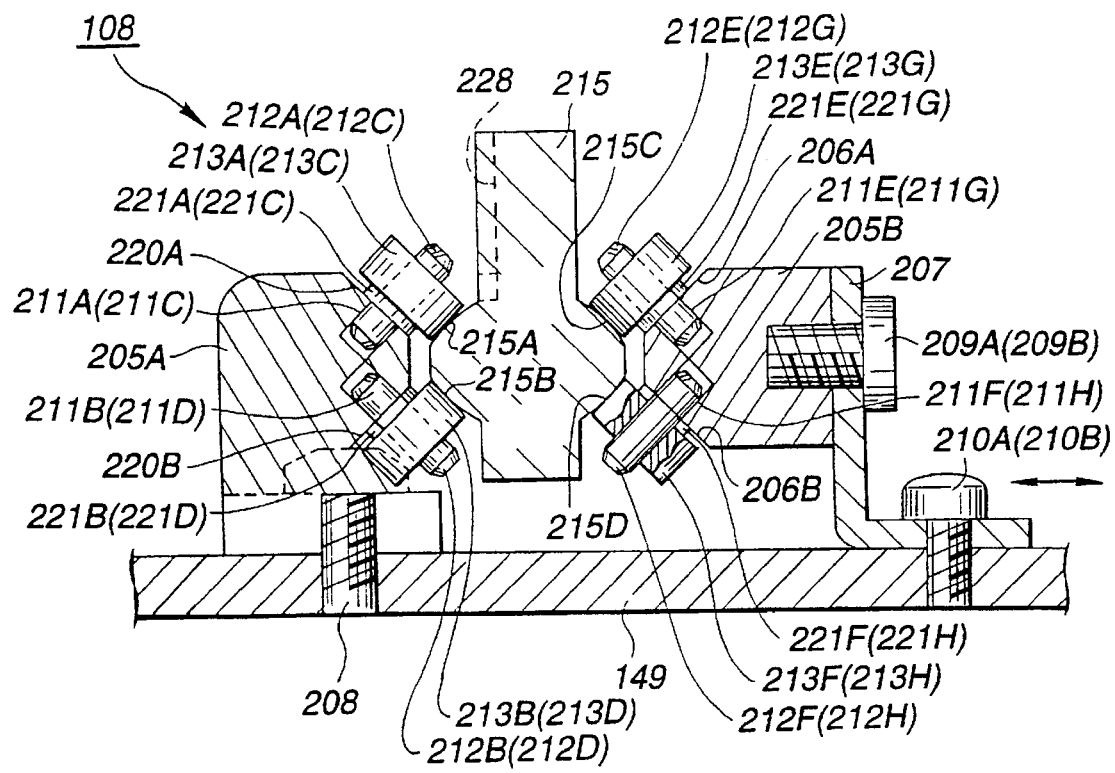
FIG. 20 is a longitudinal cross-sectional view similar to FIG. 19, showing the roll arm unit constituting the device for winding the magnetic tape of the tape cassette shown in FIG. 1.

With the device for taking up the video tape in a good condition 101 of the illustrated embodiment, the roll arm 214 of the roll arm unit 108 may be replaced by a roll arm 215 shown in FIG. 20. Similarly to the roll arm 214, this roll arm 215 is arcuately-shaped, with the center of curvature R as the center. The inner peripheral surface of the roll arm 215 is integrally formed with first and second arcuately-shaped sliding surfaces 215A, 215B. On the other hand, the outer peripheral surface of the roll arm 215 is integrally formed with third and fourth arcuately-shaped sliding surfaces 215C, 215D.

The roll arm 215 is supported for sliding movement with the first to fourth sliding surfaces 215A to 215D thereof being in sliding contact with the first to eighth bearings 213A to 213H provided on the first and second roll arm supporting members 205A, 205B.

A gear portion 228 meshing with the fourth gear 200 of the roll arm movement mechanism 107 is provided for extending along the inner peripheral surface of the roll arm 215. The touch roll 219 is rotatably supported by a supporting shaft 226 provided on one end of the roll arm 215.

The roll arm 215 of the roll arm unit 218 is supported by a point contact by the first roll arm supporting member 205A and the second roll arm supporting member 205B. Thus the slip caused to the first to fourth sliding surfaces 215A to 215D of the roll arm 215 by the sliding movement is reduced for improving reliability of the movement operation. On the other hand, the roll arm 215 prohibits the abrasion of the first to fourth sliding surfaces 215A to 215D and the first to eighth bearings 213A to 213H.

Figure 21:
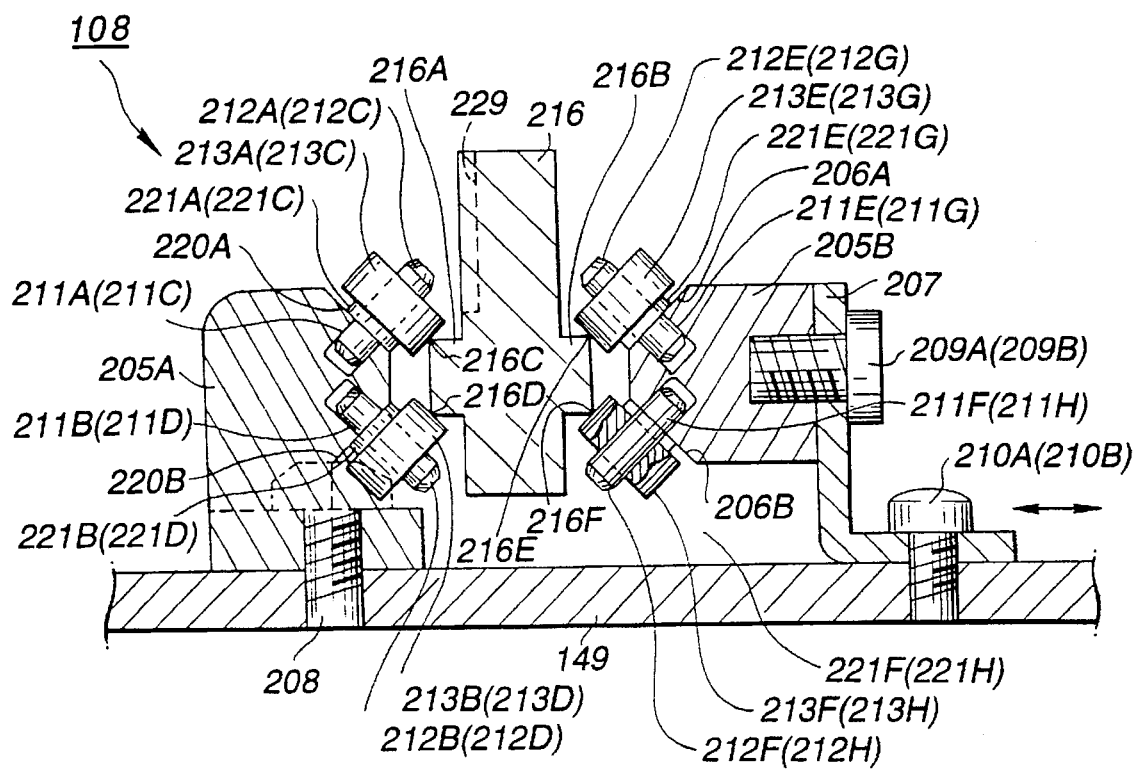
FIG. 21 is a longitudinal cross-sectional view similar to FIGS. 19 and 20, showing the roll arm unit constituting the device for winding the magnetic tape of the tape cassette shown in FIG. 1.

The roll arm 214 of the roll arm unit 108 of the device for taking up the video tape in a good condition 101 of the illustrated embodiment may be replaced by a roll arm 216 shown in FIG. 21. Similarly to the roll arm 214, this roll arm 216 is arcuately-shaped, with the center of curvature R as the center. The inner peripheral surface of the roll arm 216 is integrally formed with a first sliding protrusion 216A substantially rectangular in cross-section. The corner portions of the distal ends of the first slide protrusion 216A constitute first and second slide portions 216C and 216D.

The outer peripheral surface of the roll arm 216 is integrally formed with a second sliding protrusion 216B substantially rectangular in cross-section. The corner portions of the distal ends of the first slide protrusion 216B constitute third and fourth slide portions 216E and 216F.

The roll arm 216 is supported for sliding movement with the first to fourth sliding surfaces 216A to 216D thereof being in sliding contact with the first to eighth bearings 213A to 213H provided on the first and second roll arm supporting members 205A, 205B.

A gear portion 229 meshing with the fourth gear 200 of the roll arm movement mechanism 107 is provided for extending along the inner peripheral surface of the roll arm 216. The touch roll 219 is rotatably supported by a supporting shaft 226 provided on one end of the roll arm 216.

The roll arm 216 of the roll arm unit 108 is supported by a point contact by the first roll arm supporting member 205A and the second roll arm supporting member 205B. Thus the slip caused to the first to fourth sliding surfaces 216A to 216D of the roll arm 216 by the sliding movement is reduced for improving reliability of the movement operation. On the other hand, the roll arm 216 prohibits the abrasion of the first to fourth sliding surfaces 216A to 216D and the first to eighth bearings 213A to 213H.

Figure 22:
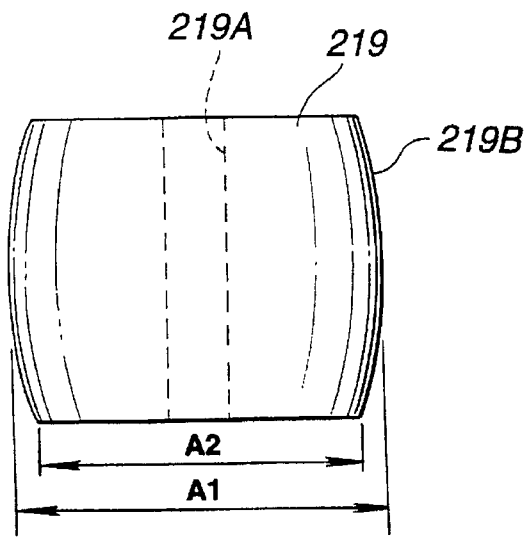
FIG. 22 is a side view showing a touch roll of the roll arm unit constituting the device for winding the magnetic tape of the tape cassette shown in FIG. 1.

The touch roll 219 is formed of e.g., rubber or a polyurethane based synthetic material in a substantially cylindrical shape, as shown in FIG. 22. The touch roll 219 is formed with a supporting hole 219A rotatably supported by the supporting shaft 226 of the roll arm 214. The axial length of the touch roll 219 has an axial length smaller than the distance between upper and lower flanges of the tape reel so that it may be intruded into a space between upper and lower flanges during the operation of winding the video tape 4 in good order as will be explained subsequently.

The touch roll 219 is arcuately-shaped in cross-section with an expanded mid portion so that its outer peripheral surface will be progressively reduced in diameter from the axially mid portion towards both end portions. Specifically, the touch roll 219 is arcuately-shaped in cross-section, with the upper end portion associated with the upper flange portion of the tape reel being slightly larger in diameter than the lower end portion associated with the lower flange portion of the tape reel.

As described above, the touch roll 219, arcuately-shaped in cross-section with the diameter being progressively reduced from the mid portion towards both end portions, thrusts the video tape 4 with a thrusting force which becomes progressively smaller from the mid portion towards both end portions. Thus the thrusting force is not acutely changed at both end portions of the touch roll 219 such that no thrusting mark by the touch roll 219 is left on the magnetic tape 4.

The above-described constitution of the touch roll 219, having a larger diameter towards the lower end, is meeting with the draft afforded to a hub of the tape reel molded of the synthetic resin material. That is, since the flange side of the tape reel contacted with a reel block operates as a reference plane, the draft is afforded to the hub so that, in consideration of the mold release following the molding, the hub is gradually decreased in diameter towards the flange side.

The touch roll 219 thrusts the video tape 4 taken up on the tape reel with a thrusting pressure which is gradually increased from the lower flange towards the upper flange. Thus the video tape 4, taken up on the tape reel the hub of which is inclined with a draft which is gradually decreased in diameter from the lower flange towards the upper flange, is thrust by the touch roll 219 with a thrusting force which is uniform in a direction along the width so that the force of restoration due to changes with lapse of time becomes uniform over the entire length of the hub.

It is also possible with the touch roll 219 to positively remove an air layer produced between it and the magnetic tape 4 taken up on the supply side reel 3 for improving the winding state of the magnetic tape 4.

Figure 23:
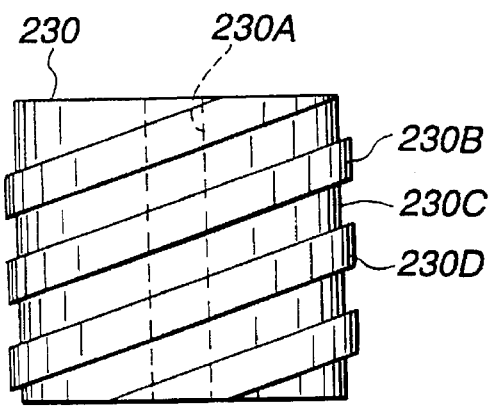
FIG. 23 is another side view showing a touch roll of the roll arm unit constituting the device for winding the magnetic tape of the tape cassette shown in FIG. 1.
Figure 24:
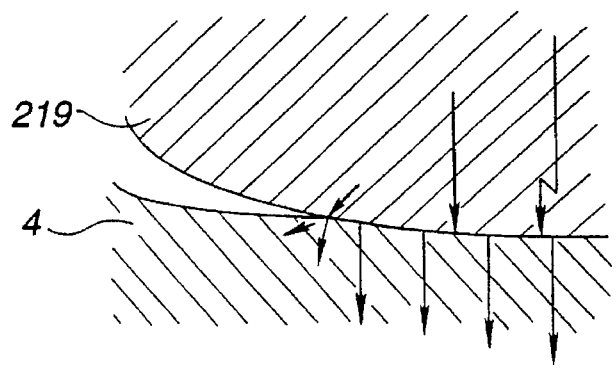
FIG. 24 is a schematic cross-sectional view for illustrating the touch roll of the roll arm unit constituting the device for winding the magnetic tape of the tape cassette shown in FIG. 1.

The touch roll used in the roll arm unit 108 in the device for taking up the video tape in a good condition 101 of the illustrated embodiment may also be replaced by a touch roll 230 shown in FIG. 23.

The touch roll 230 is formed of rubber or a polyurethane-based synthetic resin material substantially in the form of a cylinder, and has a rotation supporting opening 230A for being rotatably supported by the supporting shaft 226 of the roll arm 214. The outer periphery of the touch roll 230 is formed with a spiral groove 230C centered about the rotation supporting opening 230A for defining a spirally extending rib 230D. The spirally extending rib 230D constitutes a tape abutting surface 230B abutted against the video tape 4.

The direction of the helix of the spirally extending groove 230C is a direction which guides the video tape 4 towards the upper flange with respect to the running direction of the video tape 4.

It is possible with the above-described touch roll 230 to raise the thrusting force per unit area for a constant thrusting force. That is, the video tape 4 may be thrust against the outer periphery of the hub while a constant thrusting force is maintained over the entire width of the video tapes 4 taken up on the take-up side reel for removing the air between respective turns of the wound tape for increasing the frictional coefficient between the respective turns of the tape in order to take up the tape 4 in a trim state on the outer periphery of the hub. Thus there is no risk that the video tape 4 be changed in shape at a pre-set potion along the tape width and hence the air layer generated between the respective turns of the tape 4 taken up on the supply side reel 3 may be positively removed for improving the trim winding state of the tape 4.

With the above-described roll arm unit 108, the roll arm supporting member 205 for slidably supporting the roll arm 214 is split into the first roll arm supporting member 205A and the second roll arm supporting member 205B, so that deviations or errors generated during sliding movement of the roll arm 214 produced due to changes in the cross-sectional profile otherwise caused by dimensional tolerance of the arcuately-shaped roll arm 214 or due to expansion or contraction caused by changes in ambient temperature may be corrected easily.

As to the roll am unit 108, the pressure contact member 207 supporting the second roll arm member 205B affords a contact pressure against the second roll arm supporting member 205B. That is; the contact pressure member 207 affords a pre-set contact pressure in a direction perpendicular to the longitudinal direction of the roll arm 214 for affording a pre-set contact pressure against the first to eighth bearings 213A to 213H supporting the roll arm 214, thus improving stability in the movement operation of the roll arm 214. Thus, there is no necessity of employing a high-precision bearing for the roll arm unit 108, thereby lowering production costs.

With the above-described construction of the device for taking up the video tape in a good condition 101, the operation of the vertical movement mechanism 105, slide movement mechanism 106 and the roll arm movement mechanism 107 is explained.

The uplifted position of the vertical movement mechanism 105, in which it is receded from the base plate 109, is at a stand-by position. After the magnetic tape 4 is pulled out and the running path of the magnetic tape 4 is established, the motor for vertical movement 111 is run in rotation for moving the vertical movement base 133 to its lowered position.

By the motor for vertical movement 111 being run in rotation, the first connecting member 112 provided on the rotary shaft 111A is run in rotation. With the first connecting member 112 being run in rotation, the second connecting member 113 is run in rotation. With the second connecting member 113 being run in rotation, the rotary shaft 114 is run in rotation.

With the rotary shaft 114 being run in rotation, the worm gear 115 is run in rotation. With the worm gear 115 being run in rotation, the worm wheel 120 is run in rotation. With the worm wheel 120 being run in rotation, the driving shaft 122 is run in rotation.

With the driving shaft 122 being run in rotation, the timing belt 123 is moved via the pulley 124 mounted at the upper end of the driving shaft 122. With movement of the timing belt 123, the first and second screw guide shafts 125, 126 are run in rotation via pulleys 127, 128, respectively.

With the first and second screw guide shafts 125, 126 being run in rotation via pulleys 127, 128, the first and second guide nuts 134, 135 are moved, so that the vertical movement base 133, to which the first guide nut 134 and the second guide nut 135 are secured, are moved to the lower position along the guide shaft 129.

As the vertical movement base 133 is moved to the lower position, the motor stop member 139 provided on the outer periphery of the base 133 hides the sensor portion of the descent position sensor. With the sensor portion of the descent position sensor hidden by the motor stop member 139 provided on the base 133, the rotation of the vertical movement base 133 is stopped, at the same time that the first to third positioning shafts 141 to 143 provided on the vertical movement base 133 are abutted against the first to third positioning members 145 to 147.

With the first to third positioning shafts 141 to 143 being abutted against the first to third positioning members 145 to 147, the first to third positioning bosses 145A to 147A are engaged in the positioning holes 141A, 142A, 143A, respectively.

Thus the descent position of the vertical movement base 133 is positively set by the first to third positioning bosses 145A to 147A being engaged in the positioning holes 141A, 142A, 143A, respectively.

On the other hand, the vertical movement base 133 is moved to the lower position so that the fourth positioning shaft 144 is abutted against the abutment surface provided on the base plate 109, thus positively setting the descent position of the vertical movement base 133.

That is, with the vertical movement base 133 being moved to its descent position, the roll arm unit 108 provided on the slide base 149 superposed on the vertical movement base 133 is moved to a position in register with the magnetic tape 4 taken up on the supply side reel 3.

The first position in which the slide base 149 is in register with the M-cassette 1A represents the reference position fop the slide movement mechanism 106, as shown in FIG. 10. With the slide movement mechanism 106, the slide base 149 is moved from the first position to the second position of approaching the L-cassette 1B fop coping with the L-cassette 1B.

As for the slide movement mechanism 106, the vertical movement base 133 is moved to the lower position by the above-mentioned vertical movement mechanism 105 so that the connecting pin 151 of the driving shaft 150 provided on the vertical movement base 133 is engaged and connected with the connection groove 152A of the connection member 152 of the slide movement motor 153.

With the slide movement motor 153 being run in rotation, the slide movement mechanism 106 runs the connection member 152 in rotation. The connecting member 152, thus being run in rotation, runs the driving shaft 150 of the slide movement mechanism 160 in rotation.

The driving shaft 150, thus being run in rotation, runs the first gear 171 provided on the upper end of the driving shaft 150 in rotation. The first gear 171, thus being run in rotation, runs the second gear 172 in rotation. The second gear 172, thus being run in rotation, moves the movement pulley 174.

When the movement pulley 174 is moved, the groove formed therein is abutted against the first wire member 175A and the second wire member 175B for moving these first and second wire members 175A and 175B. The first and second wire members 175A and 175B, thus moved, moves the first position holding member 167 and the second position holding member 168 provided at both ends thereof.

The first position holding member 167 and the second position holding member 168, thus being moved, move the first guide shaft 163 and the second guide shaft 164. With the first guide shaft 163 and the second guide shaft 164 being moved along the first and second guide slits 161, 162, the slide base 149 is moved to the second position coping with the L-cassette 1B shown in FIG. 10.

The second gear 172 is moved in rotation so that the first detection lug 172B provided in the opening 172A is inserted into the groove formed in the first position sensor 172A. Thus the first position sensor 178A halts the rotation of the slide movement motor 153.

When the slide base 149 has been moved to the second position, the movement pulley 174 has its groove engaged by an engagement portion formed on the second wire member 175B. Since the spring force of the second wire member 175B is afforded to the first position holding member 167 and the second position holding member 168, the slide base 149 slid to the second position is positively secured without position deviation.

When the roll arm 214 is abutted against the magnetic tape 4 taken up on the supply side reel 3, the roll arm movement mechanism 107 runs the roll arm movement motor 182 in rotation. The roll arm movement motor 182, thus run in rotation, runs the rotary shaft 182A in rotation for running the first connecting member 183 in rotation.

The first connecting member 183, thus run in rotation, runs the second connecting member 184 in rotation. The second connecting member 184, thus run in rotation, runs the driving shaft 185 in rotation. The driving shaft 185, thus run in rotation, runs the worm gear 187 in rotation.

The worm gear 187, thus run in rotation, runs the first gear 196 in rotation. The first gear 196, thus run in rotation, runs the first supporting shaft 195 carrying the first gear 196 in rotation.

The second gear 197, thus being run in rotation, runs the third gear 199 in rotation. The third gear 199, thus run in rotation, runs the second supporting shaft 198 carrying the third gear 199 in rotation. The second supporting shaft 198, thus run in rotation, runs the fourth gear 200 provided partway on the second supporting shaft 198 in rotation.

The fourth gear 200, thus run in rotation, moves the roll arm 214 carrying the gear portion 201 meshing with the fourth gear 200. That is, with the roll arm movement motor 182 being run in rotation, the roll arm 214 is moved via the worm gear 187 and the first gear 196 to the fourth gear 200.

With the device for taking up the video tape in a good condition 101 of the illustrated embodiment, the roll arms 214, 215, 216 and the touch rolls 219, 230 may be used in an interchanged manner.

With the device for taking up the video tape of the tape cassette in a good condition, according to the present invention, the magnetic tape taken up on the tape reel may be wound positively and satisfactorily by the provision of the arcuately-shaped roll arm. In addition, the device may be reduced in size in its entirety because the distance of movement of the roll arm is reduced.

With the device for taking up the video tape of the tape cassette in a good condition, according to the present invention, the roll arm member can be abutted against the magnetic tape under a constant contact pressure, while the rotation of the roll arm movement motor is instantly halted on occurrence of an overload on the roll arm member pressure contacted with the tape reel. The result is that the roll arm driving mechanism positively prohibits the magnetic tape from being destroyed under the overload generated in the roll arm member abutted against the magnetic tape.

The touch roll, arcuately-shaped incross-section with the diameter being progressively reduced from the mid portion towards both end portions, thrusts the video tape with a thrusting force which becomes progressively smaller from the mid portion towards both end portions so that the thrusting force is not acutely changed at both end portions of the touch roll and hence no thrusting mark by the touch roll is left on the magnetic tape.

The touch roll of the device for taking up the video tape in a good condition according to the present invention is progressively increased in diameter towards the upper end and hence thrusts the video tape taken up on the tape reel with a thrusting pressure which is gradually increased from the lower flange towards the upper flange. Thus the video tape, taken up on the tape reel the hub of which is inclined with a draft which is gradually decreased in diameter from the lower flange towards the upper flange, is thrust by the touch roll with a thrusting force which is uniform in a direction along the width so that the force of restoration due to changes with lapse of time becomes uniform over the entire length of the hub. Thus there is no risk of damage to the lower flange portion.

With the device for taking up the video tape of the tape cassette in a good condition, according to the present invention, since the spirally extending rib is formed on the outer periphery of the roll, a constant thrusting force is maintained over the entire width of the video tape 4 taken up on the take-up side reel with a larger surface pressure per unit area for removing the air between respective turns of the wound tape and for increasing the frictional coefficient between the respective turns of the tape in order to take up the tape 4 in a trim state on the outer periphery of the hub. Thus there is no risk that the video tape 4 may be changed in shape at a pre-set potion along the tape width.

What is claimed is:

1. A device for winding a magnetic tape in a trim state on the outer periphery of a tape reel, said device being arranged at a mid portion between a pair of tape reels on an inner peripheral side of a running path of the magnetic tape pulled out from a tape cassette, comprising:

a touch roll abutted against the magnetic tape along the tape width for affording a constant contact pressure against the outer periphery of the tape reel as the tape is wound thereon;

an arcuately-shaped roll arm member rotatably supporting said touch roll at one end thereof for arranging said touch roll to face an inside of the tape cassette;

a roll arm supporting member for slidably supporting said roll arm member so that said touch roll is moved in a diametrical direction with respect to said tape reel;

a plate on which said roll arm supporting member is assembled; and a roll arm driving mechanism for sliding said roll arm member along said roll arm supporting member, wherein said roll arm member is moved by said roll arm driving mechanism along said roll arm supporting member so that a line of force of the contact pressure applied to said magnetic tape taken up on the outer periphery of said tape reel traverses a center of rotation of said tape reel.

2. The device for taking up a video tape as claimed in claim 1 wherein said roll arm supporting member includes a bearing member on a circumference of a circle having a center of curvature of the arcuately shaped roll arm member as a center, said bearing member slidably supporting said arcuately shaped roll arm member.

3. The device for taking up a video tape as claimed in claim 1 wherein said roll arm supporting member includes a first roll arm supporting member supporting an inner periphery of said arcuately shaped roll arm member and a second roll arm supporting member supporting an outer periphery of said arcuately shaped roll arm member.

4. The device for taking up a video tape as claimed in claim 3 wherein at least one of said first and second roll arm supporting members is provided with a flexible abutment member affording a contact pressure to said arcuately shaped roll arm member.

5. The device for taking up a video tape as claimed in claim 1 wherein said arcuately shaped roll arm member is provided with a gear portion along an inner peripheral surface thereof and is slid by said roll arm driving mechanism meshing with said gear portion.

6. The device for taking up a video tape as claimed in claim 1 wherein said roll arm member has a sliding surface of an arcuate cross-section on each lateral side thereof; said roll arm member being slidably supported by a respective sliding surface on said roll arm supporting member in a point-contact state.

7. The device for taking up a video tape as claimed in claim 1 wherein said roll arm member is integrally formed with a sliding lug of a rectangular cross-section on each lateral surface thereof, first to fourth sliding portions being formed at respective corners on an outer periphery of said sliding lugs; said roll arm member being slidably supported by said first to fourth sliding portions on said roll arm supporting member in a point-contact state.

8. The device for taking up a video tape as claimed in claim 1 wherein said touch roll supported by said roll arm member is moved towards the outer periphery of said tape reel by said roll arm driving mechanism along said roll arm supporting member in response to changes in winding diameter of said magnetic tape taken up on the outer periphery of said tape reel.

9. The device for taking up a video tape as claimed in claim 1 further comprising a vertical movement mechanism for moving said plate between an uplifted position above the running path of said magnetic tape and a descended position in which a height level of said touch roll is substantially the same as a height level of the magnetic tape taken up on said tape reel; said plate being moved from the uplifted position to the descended position after said magnetic tape is pulled out of said tape cassette.

10. The device for taking up a video tape as claimed in claim 1 wherein said roll arm driving mechanism includes a first detection sensor for detecting an amount of movement of said roll arm member and a first detection member associated with said first detection sensor; said roll arm member being adjusted in movement in response to a winding diameter of said magnetic tape taken up on said tape reel.

11. The device for taking up a video tape as claimed in claim 10 wherein said roll arm driving mechanism includes a second detection sensor for detecting an overload generated in said roll abutted against said tape reel and a second detection member associated with said second detection sensor; said roll arm driving mechanism being halted upon detection by said second detection sensor of an excess load to said touch roll.

12. A device for winding a magnetic tape in a trim state in which the magnetic tape reeled out from one of a pair of tape reels is taken up on the other of said tape reels in a trim state, said tape reels being rotatably housed within a tape cassette and each having a hub and upper and lower flanges integrally connected to upper and lower lateral sides of said hub, said magnetic tape being placed around said tape reels, the device comprising;

a cylindrically-shaped touch roll having an axial length smaller than a distance between the upper and lower flanges so that the touch roll can be intruded into a space between said upper and lower flanges for being abutted against substantially an entire area of said magnetic tape placed on the outer periphery of said hub, said touch roll being of an arcuate cross-section in an outer peripheral surface thereof, so that a diameter thereof is progressively smaller from an axial mid portion towards both axial end portions.

13. The device as claimed in claim 12 wherein a diameter of a portion of said touch roll associated with the upper flange of said tape reel is smaller than a diameter of a portion of said touch roller associated with the lower flange of said tape reel.

14. In a device for winding a magnetic tape in a trim state in which the magnetic tape reeled out from one of a pair of tape reels is taken up on the other of said tape reels in a trim state, said tape reels being rotatably housed within a tape cassette and each having a hub and upper and lower flanges integrally connected to upper and lower lateral sides of said hub, said magnetic tape being placed around said tape reels, an improvement comprising a cylindrically-shaped touch roll having an axial length smaller than a distance between the upper and lower flanges so that the touch roll can be intruded into a space between said upper and lower flanges for being abutted against substantially an entire area of said magnetic tape wound on an outer periphery of said hub, said touch roll having an integrally formed spirally extending rib on an outer periphery thereof.

15. The device as claimed in claim 14 wherein said spirally extending rib formed integrally on the outer peripheral surface of said touch roll is a spirally extending rib for guiding said magnetic tape towards said upper flange of said tape reel with respect to a running direction of said magnetic tape.

16. A device for winding a magnetic tape in a trim state comprising:

a cassette loading unit having loaded therein a plurality of tape cassettes of different outer shapes and having magnetic tape driving means for driving said magnetic tape in each of said tape cassettes;

a trim winding mechanism assembled on a supporting base; and a base driving mechanism for driving said supporting base on which said trim winding mechanism is assembled;

said trim winding mechanism including a touch roll abutted against said magnetic tape reeled out from a supply side reel and taken up on a take-up side reel for pressing said magnetic tape against an outer periphery of the hub, a roll arm member rotatably supporting said touch roll at one end thereof, a roll arm supporting member slidably supporting said roll arm member, so that the one end of said roll arm member supporting said touch roll is selectively intruded into and receded from said tape cassette, and roll arm driving means for driving said roll arm member along said roll arm supporting member for intruding said touch roll into said tape cassette and for abutting said touch roll against said magnetic tape taken up on the take-up side reel;

said trim winding mechanism having its supporting base operated in a controlled manner by said base driving mechanism depending upon the outer shape of the tape cassette and being moved to a trim winding position wherein the touch roll is intruded into a space between the upper and lower flanges.

17. The device for winding a magnetic tape as claimed in claim 16 further comprising:

a cassette loading unit for loading a first tape cassette of a first size and a second tape cassette of a second size larger than said first size; said trim winding mechanism being at an initial stand-by position in association with the first tape cassette of the first size, and said trim winding mechanism being shifted by said base driving mechanism on loading of the second tape cassette of the second larger size on said cassette loading unit, so that said touch roll is intruded into said tape cassette for performing the winding operation.

* * * * *

UNITED STATES PATENT AND TRADEMARK OFFICE
CERTIFICATE OF CORRECTION

PATENT NO. : 5,645,241
DATED : July 08, 1997
INVENTOR(S) : Hirohisa Koga, Manabu Hanjo and Takayuki Kurahara It is certified that error appears in the above-identified patent and that said Letter Patent is hereby corrected as shown below:

On the title page, item [57],

In the Abstract, line 8, change "round" to --wound--

Col.8, line 56, change "sorts" to --sort--
     line 61, change "Z" to --2--

Col.10, line 9, after "mechanism" insert --portion--
     line 46, change "128" to --126--
     line 48, change "128" to --126--
     line 53, delete "these"

Col.13, line 37, change "189L" to --169L--
     line 38, change "189P" to --169P--
     line 39, change "189M" to --169M--
     line 40, change "189P" to --169P--
     line 41, change "189N" to --169N--
     same line, change "189P" to --169P--
     line 43, change "189M" to --169M--
     line 45, change "189A" to --169A--
     same line, change "189N" to --169N--
     line 47, change "189P" to --169P--
     line 52, change "fourth" to --sixth--
     line 55, change "fourth" to --sixth--

UNITED STATES PATENT AND TRADEMARK OFFICE
CERTIFICATE OF CORRECTION

PATENT NO. : 5,645,241
DATED : July 08, 1997
INVENTOR(S) : Hirohisa Koga, Manabu Hanjo and Takayuki Kurahara It is certified that error appears in the above-identified patent and that said Letters Patent is hereby corrected as shown below:

Col.17, line 9, change "2110" to --211G--
Col.20, line 9, change "tapes" to --tape--
Col.21, line 40, change "fop" to --for--

Col.24, line 41, after "in" second occurrence, insert --a--

Signed and Sealed this

Seventeenth Day of March, 1998

Attest:

BRUCE LEHMAN

Attesting Officer

Commissioner of Patents and Trademarks